(12) United States Patent
Kim

(10) Patent No.: US 11,275,682 B2
(45) Date of Patent: Mar. 15, 2022

(54) MEMORY SYSTEM AND METHOD FOR PERFORMING COMMAND OPERATION BY MEMORY SYSTEM

(71) Applicant: SK hynix Inc., Gyeonggi-do (KR)

(72) Inventor: Byung-Jun Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/725,563

(22) Filed: Dec. 23, 2019

(65) Prior Publication Data
US 2020/0349068 A1 Nov. 5, 2020

(30) Foreign Application Priority Data
Apr. 30, 2019 (KR) .......... 10-2019-0050295

(51) Int. Cl.
*G06F 12/02* (2006.01)
*G06F 12/10* (2016.01)

(52) U.S. Cl.
CPC .......... *G06F 12/0253* (2013.01); *G06F 12/10* (2013.01); *G06F 2212/1044* (2013.01); *G06F 2212/657* (2013.01)

(58) Field of Classification Search
CPC ......... G06F 2212/7201; G06F 12/0253; G06F 2212/1044; G06F 12/10; G06F 2212/657; G06F 12/0238
USPC .................................. 711/166, 103
See application file for complete search history.

(56) References Cited

U.S. PATENT DOCUMENTS

| | | | |
|---|---|---|---|
| 7,774,541 B2 | 8/2010 | Shin et al. | |
| 9,990,278 B2 | 6/2018 | Okada et al. | |
| 2009/0244976 A1* | 10/2009 | Kajimoto | G11C 11/5635 365/185.11 |
| 2012/0198128 A1* | 8/2012 | Van Aken | G06F 12/0246 711/103 |
| 2014/0372679 A1* | 12/2014 | Flynn | G06F 13/426 711/103 |
| 2017/0168736 A1 | 6/2017 | Batra et al. | |
| 2017/0262365 A1* | 9/2017 | Kanno | G06F 12/06 |
| 2019/0199520 A1* | 6/2019 | Kim | H04L 9/0866 |
| 2020/0218465 A1* | 7/2020 | Klein | G06F 12/0246 |

* cited by examiner

*Primary Examiner* — Hashem Farrokh
(74) *Attorney, Agent, or Firm* — IP & T Group LLP

(57) ABSTRACT

A memory system includes a memory device comprising a memory block having a plurality of pages; and a controller suitable for receiving from an external device an erase request for an erase operation and a first logical address relating to the erase request, and correlating the first logical address to erase information.

16 Claims, 11 Drawing Sheets

MEMORY SYSTEM AND METHOD FOR PERFORMING COMMAND OPERATION BY MEMORY SYSTEM

CROSS-REFERENCE TO RELATED APPLICATION

This patent application claims priority under 35 U.S.C. § 119(a) to Korean Patent Application No. 10-2019-0050295, filed on Apr. 30, 2019, the entire disclosure of which is incorporated herein by reference.

BACKGROUND

1. Field

Various embodiments relate to a memory system including a memory device and a controller, and more particularly, to a memory system and a method for performing a command operation by the memory system.

2. Description of the Related Art

Recently, the paradigm for a computing environment has shifted to ubiquitous computing, which enables computer systems to be virtually accessed anytime and everywhere. As a result, the use of portable electronic devices, such as mobile phones, digital cameras, notebook computers and the like, are rapidly increasing. Such portable electronic devices typically use or include a memory system that uses or embeds at least one memory device, i.e., a data storage device. The data storage device can be used as a main storage device or an auxiliary storage device of a portable electronic device.

Unlike a hard disk, a data storage device using a non-volatile semiconductor memory device is advantageous in that it has excellent stability and durability because it has no mechanical driving part (e.g., a mechanical arm), has high data access speed, and low power consumption. In the context of a memory system having such advantages, an exemplary data storage device includes a USB (Universal Serial Bus) memory device, a memory card having various interfaces, a solid state drive (SSD) or the like.

SUMMARY

Various embodiments of the present invention are directed to a memory system that may perform a command operation in response to an erase request by correlating a received logical address to erase information when the erase request and the logical address are received from a host. Accordingly, the embodiments may provide a memory system that may reduce erase operation time as compared to performing an erase operation relating to the erase request and then transmitting the performance result to the host, and a method for performing the command operation by the memory system.

Also, various embodiments of the present invention are directed to a memory system that may improve the utilization of a memory device because a received logical address corresponds to one erase physical address even though the size of data relating to the logical address requested to be erased by a host is larger than the storage capacity of one page.

In accordance with an embodiment, a memory system may include: a memory device comprising a memory block having a plurality of pages; and a controller suitable for receiving an erase request for an erase operation and a first logical address relating to the erase request from an external device, and correlating the first logical address to erase information. The controller transmits a response for the erase request to the external device after correlating the first logical address to the erase information. The erase information comprises an erase physical address of an erase page or an erase memory block in an erase state. The controller does not use the erase page or the erase memory block for storage of data after correlating the first logical address to the erase physical address. The erase information comprises an erase state value. The controller searches for a physical address correlating to the first logical address in map data, invalidates the physical address and performs a garbage collection on the invalidated physical address, and the map data comprises a logical address used in the external device and a physical address of the memory device. The controller transmits the response to the external device before performing the garbage collection. When a first physical address which corresponds to the first logical address and is valid, is received from the external device, the controller invalidates the valid first physical address, and performs a garbage collection on the invalidated first physical address. The controller transmits the response to the external device before performing the garbage collection.

In accordance with an embodiment, a method for performing a command operation by a memory system that includes a memory device including a memory block having a plurality of pages and a controller suitable for controlling the memory device, the method may comprise receiving an erase request for an erase operation and a first logical address relating to the erase request, from an external device; and correlating the first logical address to erase information. The method may further comprise transmitting a response for the erase request to the external device after the correlating the first logical address to the erase information. The erase information comprises an erase physical address of an erase page or an erase memory block in an erase state. The erase page or the erase memory block is not used for storage of data after the correlating of the first logical address to the erase information. The erase information comprises an erase state value. The method may further comprise: searching map data for a physical address, correlating to the first logical address; invalidating the searched physical address in the map data; and performing a garbage collection on the invalidated physical address, the map data comprises a logical address used in the external device and a physical address of the memory device. The transmitting of the response for the erase request to the external device is performed before the performing of the garbage collection on the invalidated physical address. The method may further comprise: when a first physical address, which corresponds to the first logical address and is valid, is further received from the external device, invalidating the valid first physical address in map data; and performing a garbage collection on the invalidated first physical address, the map data comprises a logical address used in the external device and a physical address of the memory device. The method may further comprise: receiving a read request and a second logical address from the external device after the correlating of the first logical address to the erase information; and transmitting a response for the read request including a message indicating that data relating to the second logical address is not stored in the memory device to the external device when the second logical address corresponds to the erase information. The method may further comprise: receiving a read request and a second logical address from the external device after the correlating of the first logical address to the erase information; and transmitting a response for the read request including a message indicating that data relating to the second logical address is not searched in the memory device to the external device when the second logical address does not correspond to the erase information.

In accordance with an embodiment, a method of reducing erase time in a memory system including a memory device, the method comprising: receiving an erase request for an erase operation and a logical address related to the erase request; correlating the logical address to an erase location in the memory device; searching map data for a physical address corresponding to the logical address; invalidating the physical address found in the searching operation; and performing a garbage collection on the invalidated physical address based on a garbage collection trigger condition.

DETAILED DESCRIPTION

Figure 1:
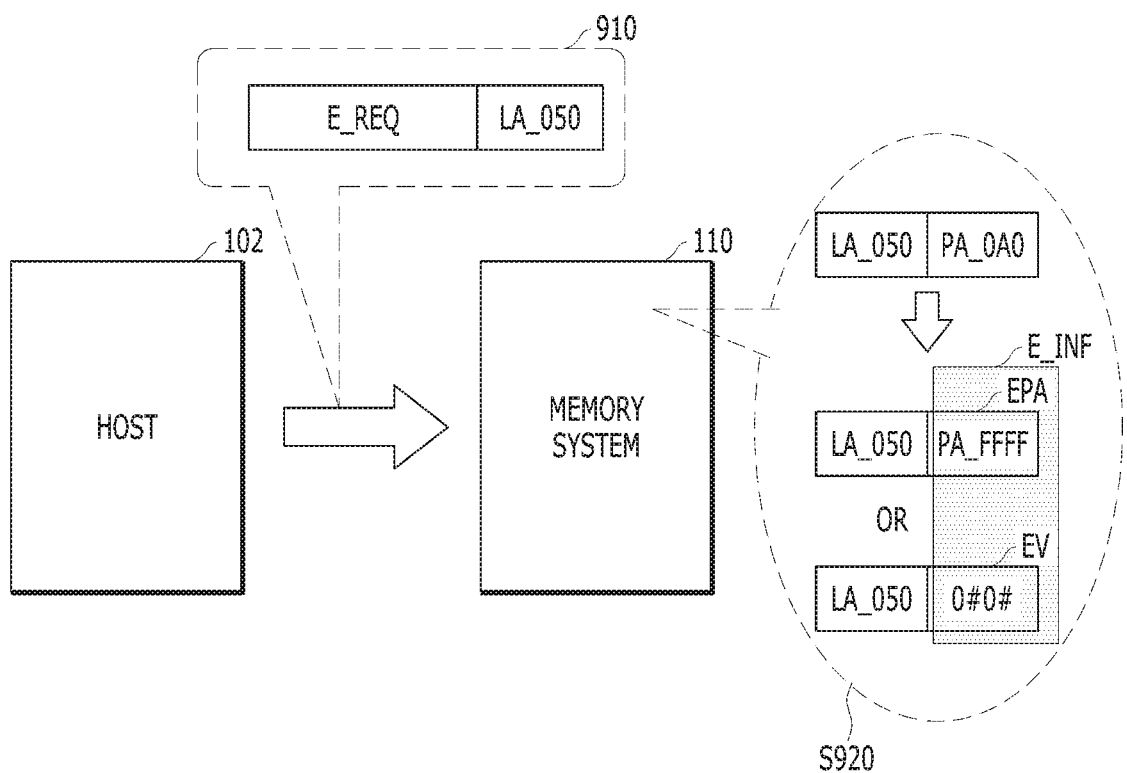
FIG. 1 is a block diagram illustrating a method for performing a command operation by a memory system in response to an erase request in accordance with an embodiment of the present invention.

Various embodiments of the disclosure are described below in more detail with reference to the drawings. Elements and features of the disclosure, however, may be configured or arranged differently to form other embodiments, which may be variations of any of the disclosed embodiments. Thus, the invention is not limited to the embodiments set forth herein. Rather, the described embodiments are provided so that this disclosure is thorough and complete, and fully conveys the scope of the disclosure to those skilled in the art to which this invention pertains. It is noted that reference to "an embodiment," "another embodiment" or the like does not necessarily mean only one embodiment, and different references to any such phrase are not necessarily to the same embodiment(s).

It will be understood that, although the terms "first", "second", "third", and so on may be used herein to identify various elements, these elements are not limited by these terms. These terms are used to distinguish one element from another element that otherwise have the same or similar names. Thus, a first element in one instance could also be termed a second or third element in another instance without indicating any change in the underlying element.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via an intervening element therebetween. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the invention. As used herein, singular forms are intended to include the plural forms and vice versa, unless the context clearly indicates otherwise. The articles 'a' and 'an' as used in this specification and the appended claims should generally be construed to mean 'one or more' unless specified otherwise or it is clear from context to be directed to a singular form.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the disclosure and the relevant art, and are not be interpreted in an idealized or overly formal sense unless expressly so defined herein.

In the following description, numerous specific details are set forth in order to provide a thorough understanding of the invention. The invention may be practiced without some or all of these specific details. In other instances, well-known process structures and/or processes have not been described in detail in order not to unnecessarily obscure the invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system including a memory system in accordance with an embodiment.

The data processing system may include a memory system 110 and a host 102. The memory system 110 may include a memory device including a non-volatile memory device and be electrically coupled to the host 102. The host 102 may transmit a request, an address and data to the memory system 110. The memory system 110 may store data relating to the request and the address received from the host 102, erase data or transmit the stored data to the host 102.

For example, the request that the host 102 transmits to the memory system 110 may be for reading, writing or erasing data. The host 102 may transmit a logical address together with the request to the memory system 110.

The memory system 110 may generate, manage and store map data or a mapping table for corresponding a logical address used in the host 102 to a physical address of the memory device. The memory system 110 may store data in the memory device, and then generate or update a physical address or a physical resource allocation indicating a storage location of the stored data, which corresponds to a logical address of the stored data. The map data may have the size of approximately 0.1% of a data storage space of the memory system 110.

The host 102 may transmit an erase request E_REQ for an erase operation and a logical address relating thereto to the memory system 110. In the present embodiment, the logical address transmitted by the host 102 with the erase request E_REQ to the memory system 110 may be referred to as a "first logical address". When the host 102 stores the map data, the host 102 may transmit a first physical address corresponding to the first logical address as well as the erase request E_REQ and the first logical address to the memory system 110. In the present embodiment, a physical address transmitted by the host 102 with the erase request E_REQ to the memory system 110 may be referred to as a "first physical address".

In addition, in the present embodiment, the erase request E_REQ for the erase operation of the memory system may include any of a sanitize request, a secure request, a TRIM request, a delete request, an unmap request, a discard request and a format request. The memory system 110 may perform a logical erase operation or a physical erase operation according to the aforementioned request type.

When the memory system 110 receives the erase request E_REQ and the first logical address relating thereto from the host 102, the memory system 110 may perform an erase operation of data stored in a memory device and related to the first logical address. The erase operation may include an operation which corresponds the first logical address to erase information E_INF in S920. The erase operation may further include a garbage collection for physically erasing the data stored in a memory device and related to the first logical address.

The memory system 110 may search for a second physical address corresponding to the first logical address in the map data stored in the memory system 110 for performing the unmap operation. Then, the memory system 110 may deactivate or erase map information of the first logical address included in the map data for performing the unmap operation, thereby releasing a corresponding relationship between the first logical address and the second physical address. The unmap operation may further include an invalidate operation of the second physical address by updating the physical address into an invalid address information INV_INF.

In addition, when the memory system 110 further receives the first physical address corresponding to the first logical address from the host 102, the memory system 110 may perform the unmap operation without searching for a physical address corresponding to the first logical address. In the present embodiment, a physical address corresponding to a logical address transmitted by the host 102 with the erase request E_REQ and included in the map data stored in the memory system 110 may be referred to as a "second physical address".

After the memory system 110 performs the unmap operation on the first logical address, the host 102 may transmit a read request and a second logical address corresponding the read request to the memory system 110. In the present embodiment, a logical address transmitted by the host 102 with a read request to the memory system 110 will be referred to as a "second logical address".

When the second logical address is the same as the first logical address on which the unmap operation is performed, it is difficult for the memory system 110 to determine whether to send a first message indicating that data relating to the second logical address received from the host 102 is not stored in the memory device or a second message indicating that data relating to the second logical address cannot be found in the memory device to the host.

Specifically, when the memory system 110 deactivates or erases the map information related to the first logical address in the map data by the unmap operation on the first logical address, the memory system 110 may not find the map information of the first logical address in the map data. When the second logical address is the same as the first logical address which has been already performed the unmap operation, the memory system 110 may not find map information of the second logical address in the map data.

Accordingly, the memory system 110 may not determine whether the data relating to the second logical address is not stored in the memory device, or the data is stored in the memory device but cannot be found by an error in the map data or the map information, or by erasing the map data or the map information.

In other words, when the map information of the logical address is erased by performing the unmap operation, such action provides the same result as when data relating to the logical address is erased from the memory system 110. However, since the memory system 110 cannot search for the physical address corresponding to the logical address on which the unmap operation is performed in the map data, it is difficult for the memory system 110 to distinguish between a case where the data relating to the specific logical address is actually erased and a case where the map information of the specific logical address cannot be accessed.

The erase operation is performed in units of memory blocks. When a size of the data requested to be erased is smaller than a size of one memory block, the memory system 110 does not erase the data. The memory system 110 erases the data when the memory block including the data requested to be erased becomes a target of a garbage collection. In addition, when the size of data relating to the first logical address is 1 Gbyte, and the size of data which may be stored in one page in the memory device is 4 Kbytes, the memory system 110 may perform the unmap operation and needs to perform the garbage collection on 2.5 million pages. Accordingly, erase latency may be increased.

As illustrated in FIG. 1, when the memory system 110 according to the present embodiment receives a request set 910 including the erase request E_REQ for the erase operation and a first logical address LA_050 from the host 102, the memory system 110 may perform the erase operation by correlating the first logical address LA_050 to erase information E_INF (S920). In the present embodiment, the erase information E_INF may include an erase physical address EPA of an erase page which is in an erase state or an erase memory block which is in an erase state. In addition, the erase information E_INF may include an erase state value EV.

In the present embodiment, the memory system 110 may correlate the first logical address LA_050 received from the host 102 to the erase physical address EPA for performing the erase operation. In other words, the memory system 110 may invalidate a second physical address, e.g., PA_0A0, which has been mapped to the first logical address LA_050 in the map data, and newly map the first logical address LA_050 with "PA_FFFF" or equivalent which is the erase physical address EPA.

The erase physical address EPA may include a physical location of an erase page and/or an erase memory block in an erase state of the memory device included in the memory system 110. The erase page and the erase memory block may not be used for storing data.

In the present embodiment, the erase page and the erase memory block which are not used for storing data may be designated during a semiconductor device manufacturing process or booting, i.e., power-on of the memory system 110. In addition, the erase page and the erase memory block may be designated during an operation of the memory system 110. For example, the erase page and the erase memory block may include a bad block that is not used for storing data or a page of the bad block. In addition, the erase page and the erase memory block may include a spare memory block that is not used for storing data or a page of the spare memory block. However, the erase page and the erase memory block of the present embodiment are not limited thereto.

The erase state value EV may include a value that has a form of a physical address but is not actually used beyond the range of the physical address such as a memory block and a page in the memory device. In addition, the erase state value EV may include a specific code value that is not in the form of the physical address.

In other words, when the memory system 110 receives the request set 910 including the erase request E_REQ and the first logical address LA_050, the memory system 110 may correlate the first logical address LA_050 to the erase physical address, e.g., PA_FFFF (see S920). That is, the memory system 110 may invalidate the second physical address, e.g., PA_0A0, which has been already mapped to the first logical address, e.g., LA_050, in the map data. Then the memory system 110 may newly map the first logical address LA_050 to "PA_FFFF" in this example which is the erase physical address EPA. Alternatively, the memory system 110 may change a code value of the second physical address PA_0A0 in the map data to "0#0#" which is the erase state value EV (see S920). In addition, in the present embodiment, the memory system 110 may change an erase state value of the first logical address LA_050 to "0#0#" or equivalent, which is the erase state value EV (see S920).

When the second logical address is received together with the read request from the host 102 after the first logical address LA_050 corresponds to the erase information E_INF, the memory system 110 determines whether the second logical address corresponds to the erase information E_INF.

When the second logical address is the same as the first logical address LA_050, the second logical address corresponds to the erase information E_INF. The memory system 110 according to the present embodiment may determine that the data relating to the second logical address is actually erased and no longer stored in the memory device. Accordingly, the memory system 110 may transmit to the host 102 a message indicating that the data relating to the second logical address is not stored in the memory device as a response to the read request.

In addition, when the second logical address is not the same as the first logical address LA_050, the second logical address does not correspond to the erase information E_INF. Accordingly, the map information of the second logical address is not searched in the map data. The memory system 110 according to the present embodiment may determine that the data relating to the second logical address is stored in the memory device but cannot be found in the memory device. Accordingly, the memory system 110 may transmit to the host 102 a message indicating that the data relating to the second logical address cannot be found in the memory device as a response to the read request.

In other words, the memory system 110 according to the present embodiment may clearly distinguish a case where the data relating to the first logical address is normally erased and a case where the data relating to the first logical address cannot be found.

In addition, the memory system 110 may determine that an erase operation according to the erase request E_REQ has been completely performed when the first logical address to the erase physical address EPA is erased or has the erase state value EV. Accordingly, the memory system 110 may transmit a response Ack of the received erase request E_REQ to the host 102.

In other words, a result of the erase operation of the present embodiment is the same as a result of garbage collection which is an actual data erase operation. The response Ack of the erase request E_REQ may be transmitted to the host 102 before data stored at the physical address corresponding to the first logical address is actually erased through the garbage collection. That is, since the erase operation of the present embodiment is performed without the garbage collection, the erase operation time can be reduced. The present embodiment can reduce erasure latency that may occur due to garbage collection.

According to the present embodiment, the memory system 110 may perform the garbage collection based on information about logical addresses corresponding to the erase physical address EPA and the erase state value EV. For example, when the number of logical addresses corresponding to the erase physical address EPA and the erase status value EV reaches a set level, the memory system 110 may determine that it is necessary to perform the garbage collection. As a trigger for performing the garbage collection, the number of logical addresses corresponding to the erase physical address EPA and the erase state value EV may be used. Also, the memory system 110 may perform the garbage collection based on information about the second physical addresses which are invalidated. For example, when the number of the second physical addresses reaches a set level, the memory system 110 may determine that it is necessary to perform the garbage collection. As a trigger for performing the garbage collection, the number of the second physical addresses may be used.

According to the present embodiment, the memory system 110 may correlate the first logical address to different erase information E_INF, respectively, according to a type of the erase request E_REQ related to the first logical address. For example, the memory system 110 may correlate the first logical address related to a delete request to first erase information E_INF, correlate the first logical address related to the discard request to second erase information E_INF, correlate the first logical address related to the unmap request to third erase information E_INF, and map the first logical address related to the format request to fourth erase information E_INF.

The memory system 110 may correlate the first logical address to different erase information E_INF, respectively, according to an operation priority of the erase request E_REQ related to the first logical address. For example, the memory system 110 may correlate the first logical address having the highest operation priority to first erase information E_INF, correlate the first logical address having the second highest operation priority to second erase information E_INF, correlate the first logical address having the third highest operation priority to third erase information E_INF, and map the first logical address having the lowest operation priority to fourth erase information E_INF.

When specific data stored in the memory device is hacked or infected by a virus, the host 102 may transmit the erase request E_REQ having the highest operation priority together with the first logical address to the memory system 110 to request urgent erase operation on the specific data. In this case, the memory system 110 correlates the received first logical address having the highest operation priority to the first erase information E_INF to perform an urgent erase operation on the specific data. The memory system 110 may determine a page or a memory block corresponding to a second physical address corresponding to the first logical address as a target for an urgent garbage collection. The memory system 110 may set a trigger reference value for performing the garbage collection differently by using the erase information E_INF having different operation priorities.

The erase operation of data stored in the memory system 110 may be performed in units of memory blocks. When a size of the data relating to the first logical address is smaller than a size of one memory block, the memory system 110 just correlates the first logical address to the erase information E_INF. The memory system 110 does not erase the data relating to the first logical address. The data may be regarded as invalid data. As a ratio of invalid pages in the memory block storing the invalid data relating to the first logical address increases, the memory block may be a target of the garbage collection of actual erase operation.

In other words, in the present embodiment, the erase operation according to the erase request E_REQ may be performed by correlating the first logical address to the erase information E_INF, Thus, the time required to perform the erase request E_REQ may be reduced.

Even though the size of the data relating to the first logical address is large, the first logical address is mapped to the erase physical address EPA of at least one erase page. Therefore, the utilization of the memory device 150 may be improved.

In the present embodiment, the garbage collection may not be performed whenever the erase request E_REQ is received, but may be performed when the state of the memory system satisfies a condition for the garbage collection. Accordingly, the overhead of the memory system 110 may be decreased.

Figure 2:
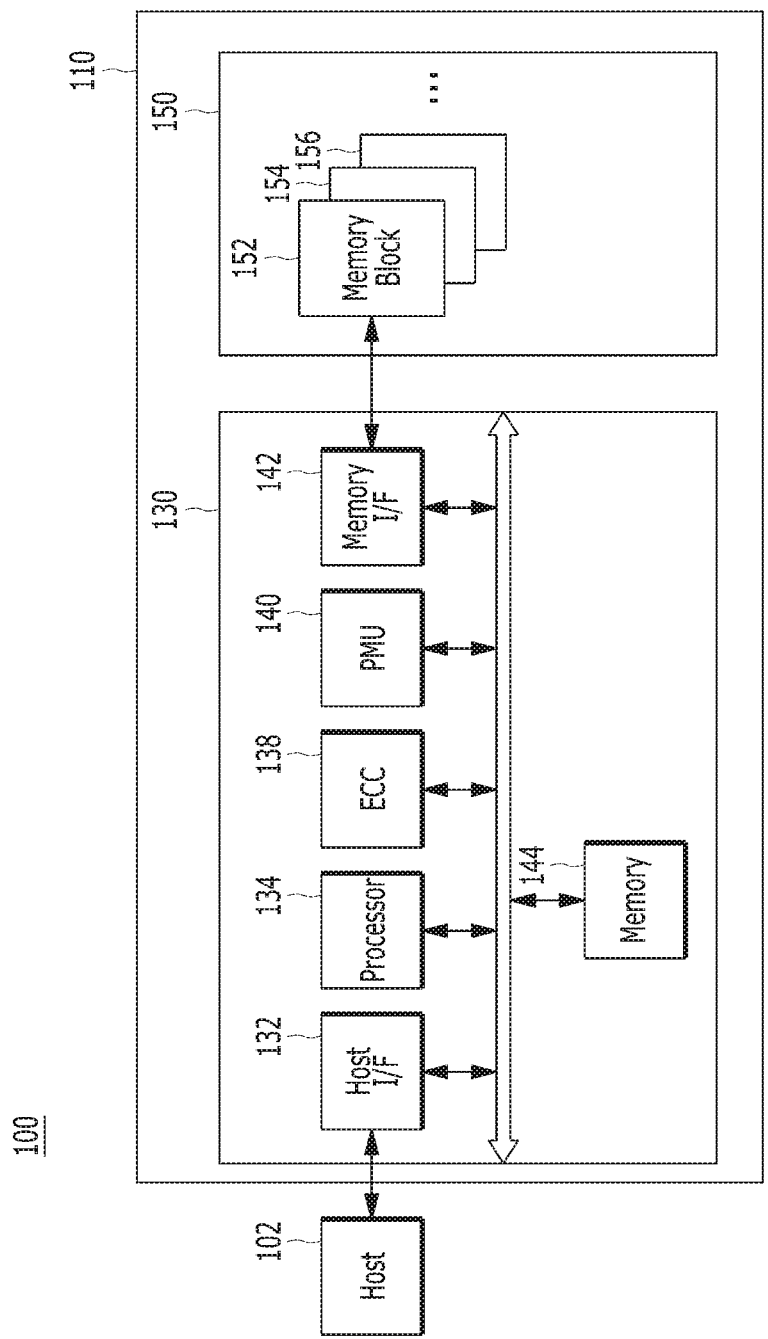
FIG. 2 is a block diagram illustrating a data processing system including a memory system in accordance with an embodiment of the present invention.

FIG. 2 is a block diagram illustrating a data processing system 100 in accordance with an embodiment of the present invention.

Referring to FIG. 2, the data processing system 100 may include a host 102 operably engaged or coupled with a memory system 110.

The host 102 may include, for example, a portable electronic device, such as a mobile phone, an MP3 player or a laptop computer, or an electronic device, such as a desktop computer, a game player, a television (TV), a projector or any of various other suitable electronic devices.

The host 102 also includes at least one operating system (OS), which can generally manage, and control, functions and operations performed in the host 102. The OS can provide interoperability between the host 102 engaged with the memory system 110 and the user of the memory system 110. The OS may support functions and operations corresponding to user's requests. By way of example but not limitation, the OS can be classified into a general operating system and a mobile operating system according to mobility of the host 102. The general operating system may be split into a personal operating system and an enterprise operating system according to system requirements or a user's environment. The personal operating system, including Windows and Chrome, may be subject to support services for general purposes. But the enterprise operating systems can be specialized for securing and supporting high performance, including Windows servers, Linux, Unix and the like. Further, the mobile operating system may include an Android, an iOS, a Windows mobile and the like. The mobile operating system may be subject to support services or functions for mobility (e.g., a power saving function). The host 102 may include a plurality of operating systems. The host 102 may execute multiple operating systems interlocked with the memory system 110, corresponding to a user's request. The host 102 may transmit a plurality of commands corresponding to the user's requests into the memory system 110, thereby performing operations corresponding to commands within the memory system 110. Handling plural commands in the memory system 110 is described below with reference to FIGS. 4 and 5.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage device(s) for the memory system 110 may be implemented with a volatile memory device, for example, a dynamic random access memory (DRAM) and/or a static RAM (SRAM), and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM) and/or a flash memory.

The memory system 110 may include a controller 130 and a memory device 150. The memory device 150 may store data to be accessed by the host 102. The controller 130 may control storage of data in the memory device 150.

The controller 130 and the memory device 150 may be integrated into a single semiconductor device, which may be included in any of the various types of memory systems as exemplified above.

By way of example but not limitation, the controller 130 and the memory device 150 may be integrated into a single semiconductor device. The controller 130 and memory device 150 may be so integrated into an SSD to improve an operation speed. When the memory system 110 is used as an SSD, the operating speed of the host 102 connected to the memory system 110 can be improved more than that of the host 102 implemented with a hard disk. In addition, the controller 130 and the memory device 150 may be integrated into one semiconductor device to form a memory card, such as a PC card (PCMCIA), a compact flash card (CF), a memory card such as a smart media card (SM, SMC), a memory stick, a multimedia card (MMC, RS-MMC, MMC-micro), a SD card (SD, miniSD, microSD, SDHC), a universal flash memory or the like.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device and may retain data stored therein even when no electrical power is supplied. The memory device 150 may store data provided from the host 102 through a write operation, and provide data stored therein to the host 102 through a read operation. The memory device 150 may include a plurality of memory blocks 152, 154, 156, each of which may include a plurality of pages. Each of the plurality of pages may include a plurality of memory cells to which a plurality of word lines (WL) are electrically coupled. The memory device 150 also includes a plurality of memory dies, each of which includes a plurality of planes, each of which includes a plurality of memory blocks 152, 154, 156. In addition, the memory device 150 may be a non-volatile memory device, for example a flash memory, wherein the flash memory may be a three-dimensional stack structure.

The controller 130 may control overall operations of the memory device 150, such as read, write, program and erase operations. For example, the controller 130 may control the memory device 150 in response to a request from the host 102. The controller 130 may provide the data, read from the memory device 150, with the host 102. The controller 130 may store the data, provided by the host 102, into the memory device 150.

The controller 130 may include a host interface (I/F) 132, a processor 134, an error correction code (ECC) component 138, a power management unit (PMU) 140, a memory interface (I/F) 142 and a memory 144, all operatively coupled via an internal bus.

The host interface 132 may process commands and data provided from the host 102, and may communicate with the host 102 through at least one of various interface protocols such as universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (PATA), small computer system interface (SCSI), enhanced small disk interface (ESDI) and integrated drive electronics (IDE). In accordance with an embodiment, the host interface 132 is a component for exchanging data with the host 102, which may be implemented through firmware called a host interface layer (HIL).

The ECC component 138 can correct error bits of the data to be processed in (e.g., outputted from) the memory device 150, which may include an ECC encoder and an ECC decoder. Here, the ECC encoder can perform error correction encoding of data to be programmed in the memory device 150 to generate encoded data to which a parity bit is added and store the encoded data in memory device 150. The ECC decoder can detect and correct errors contained in a data read from the memory device 150 when the controller 130 reads the data stored in the memory device 150. In other words, after performing error correction decoding on the data read from the memory device 150, the ECC component 138 can determine whether the error correction decoding has succeeded and output an instruction signal (e.g., a correction success signal or a correction fail signal). The ECC component 138 can use the parity bit which is generated during the ECC encoding process, for correcting the error bit of the read data. When the number of the error bits is greater than or equal to a threshold number of correctable error bits, the ECC component 138 may not correct error bits but instead may output an error correction fail signal indicating failure in correcting the error bits.

The ECC component 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC component 138 may include any and all circuits, modules, systems or devices for performing the error correction operation based on at least one of the above described codes.

The PMU 140 may manage, control or provide an electrical power provided in the controller 130.

The memory interface 142 may serve as an interface for handling commands and data transferred between the controller 130 and the memory device 150, to correspond the controller 130 to control the memory device 150 in response to a request delivered from the host 102. The memory interface 142 may generate a control signal for the memory device 150 and may process data entered into or outputted from the memory device 150 under the control of the processor 134 in a case when the memory device 150 is a flash memory and, in particular, when the memory device 150 is a NAND flash memory. The memory interface 142 can provide an interface for handling commands and data between the controller 130 and the memory device 150, for example, operations of NAND flash interface, in particular, operations between the controller 130 and the memory device 150. In accordance with an embodiment, the memory interface 142 can be implemented through firmware called a Flash Interface Layer (FIL) as a component for exchanging data with the memory device 150.

The memory 144 may support operations performed by the memory system 110 and the controller 130. The memory 144 may store temporary or transactional data generated or delivered for operations in the memory system 110 and the controller 130. The controller 130 may control the memory device 150 in response to a request from the host 102. The controller 130 may deliver data read from the memory device 150 to the host 102. The controller 130 may store data entered through the host 102 within the memory device 150. The memory 144 may be used to store data for the controller 130 and the memory device 150 to perform operations such as read operations or program/write operations.

The memory 144 may be implemented with a volatile memory. The memory 144 may be implemented with a static random access memory (SRAM), a dynamic random access memory (DRAM) or both. Although FIG. 2 exemplifies the second memory 144 disposed within the controller 130, the present invention is not limited thereto. That is, the memory 144 may be located within or external to the controller 130. For instance, the memory 144 may be embodied by an external volatile memory having a memory interface transferring data and/or signals between the memory 144 and the controller 130.

The memory 144 can store data necessary for performing operations such as data writing and data reading requested by the host 102 and/or data transfer between the memory device 150 and the controller 130 for background operations such as garbage collection and wear levelling as described above. In accordance with an embodiment, for supporting operations in the memory system 110, the memory 144 may include a program memory, a data memory, a write buffer/cache, a read buffer/cache, a data buffer/cache, a map buffer/cache, and the like.

The memory 144 may store map data and state information. The controller map data includes L2P map data comprising L2P segments including a logical address used in the host 102 and a physical address of the memory device 150 corresponding to the logical address. The controller map data may further include P2L map data comprising P2L segments including the physical address used and the logical address corresponding to the physical address.

In accordance with an embodiment, when an erase request E_REQ with the first logical address from the host 102 is received, the controller 130 correlates the first logical address from the host 102 to erase information E_INF including an erased physical address EPA or an erased state value EV. The controller 130 may perform an unmap operation to the first logical address by invalidating a physical address mapped to the first logical address in the map data. Then the controller 130 correlates the first logical address to an erased physical address EPA or an erased state value EV in the map data.

In addition, the memory 144 may store state information as well as controller map data. The state information may include dirty information, invalid address information, valid storage element information, free block number information, and erase state information. The memory system 110 may determine validity of a physical address and a logical address received with an erase request E_REQ from a host 102 using dirty information or invalid address information. In an embodiment of the present disclosure, when the erase request E_REQ is received with the logical address, the controller 130 updates erase state information of the logical address to have an erase state value EV. In addition, the memory system 110 may invalidate a physical address corresponding to a logical address of the erase request E_REQ, and then change the valid page count VPC of the memory block corresponding to the invalidated physical address. In addition, the memory system 110 may perform garbage collection on a memory block having less valid pages than a set number. when the number of free blocks is less than or equal to a set number.

The processor 134 may be implemented with a microprocessor and/or a central processing unit (CPU). The memory system 110 may include one or more processors 134. The processor 134 may control the overall operations of the memory system 110. By way of example but not limitation, the processor 134 can control a program operation or a read operation of the memory device 150, in response to a write request or a read request entered from the host 102. In accordance with an embodiment, the processor 134 may use or execute firmware to control the overall operations of the memory system 110. Herein, the firmware may be referred to as a flash translation layer (FTL). The FTL may perform an operation as an interface between the host 102 and the memory device 150. The host 102 may transmit requests for write and read operations to the memory device 150 through the FTL.

The FTL may manage operations of address mapping, garbage collection, wear-leveling and the like. Particularly, the FTL may load, generate, update, or store map data. Therefore, the controller 130 may map a logical address, which is entered from the host 102, with a physical address of the memory device 150 through the map data. The memory device 150 may look like a general storage device to perform a read or write operation because of the address mapping operation. Also, through the address mapping operation based on the map data, when the controller 130 tries to update data stored in a particular page, the controller 130 may program the updated data on another empty page and may invalidate old data of the particular page (e.g., update a physical address, corresponding to a logical address of the updated data, from the previous particular page to the another newly programmed page) due to a characteristic of a flash memory device. Further, the controller 130 may store map data of the new data into the FTL.

For example, when performing an operation requested from the host 102 in the memory device 150, the controller 130 uses the processor 134. The processor 134 engaged with the memory device 150 can handle instructions or commands corresponding to an inputted command from the host 102. The controller 130 can perform a foreground operation as a command operation, corresponding to an command inputted from the host 102, such as a program operation corresponding to a write command, a read operation corresponding to a read command, an erase/discard operation corresponding to an erase/discard command and a parameter set operation corresponding to a set parameter command or a set feature command with a set command.

For another example, the controller 130 may perform a background operation on the memory device 150 through the processor 134. By way of example but not limitation, the background operation for the memory device 150 includes an operation of copying data stored in a memory block among the memory blocks 152, 154, 156 and storing such data in another memory block, e.g., a garbage collection (GC) operation. The background operation can include an operation of moving or swapping data between memory blocks of the memory blocks 152, 154, 156, e.g., a wear leveling (WL) operation. During a background operation, the controller 130 may use the processor 134 for storing the map data stored in the controller 130 to at least one of the memory blocks 152, 154, 156 in the memory device 150, e.g., a map flush operation. A bad block management operation of checking or searching for bad blocks among the memory blocks 152, 154, 156 is another example of a background operation performed by the processor 134.

In the memory system 110, the controller 130 performs a plurality of command operations corresponding to a plurality of commands entered from the host 102. For example, when performing a plurality of program operations corresponding to plural program commands, a plurality of read operations corresponding to plural read commands and a plurality of erase operations corresponding to plural erase commands sequentially, randomly or alternatively, the controller 130 can determine which channel(s) or way(s) among a plurality of channels (or ways) for connecting the controller 130 to a plurality of memory dies included in the memory 150 is/are proper or appropriate for performing each operation. The controller 130 can send or transmit data or instructions via determined channels or ways for performing each operation. The plurality of memory dies included in the memory 150 can transmit an operation result via the same channels or ways, respectively, after each operation is complete. Then, the controller 130 may transmit a response or an acknowledge signal to the host 102. In an embodiment, the controller 130 can check a status of each channel or each way. In response to a command entered from the host 102, the controller 130 may select at least one channel or way based on the status of each channel or each way so that instructions and/or operation results with data may be delivered via selected channel(s) or way(s).

By way of example but not limitation, the controller 130 can recognize statuses regarding a plurality of channels (or ways) associated with a plurality of memory dies included in the memory device 150. The controller 130 may determine the state of each channel or each way as a busy state, a ready state, an active state, an idle state, a normal state and/or an abnormal state. The controller's determination of which channel or way an instruction (and/or a data) is delivered through can be associated with a physical block address, e.g., to which die(s) the instruction (and/or the data) is delivered. The controller 130 can refer to descriptors delivered from the memory device 150. The descriptors can include a block or page of parameters that describe relevant information about the memory device 150, which is data with a specific format or structure. For instance, the descriptors may include device descriptors, configuration descriptors, unit descriptors, and the like. The controller 130 can refer to, or use, the descriptors to determine which channel(s) or way(s) an instruction or a data is exchanged via.

A management unit (not shown) may be included in the processor 134. The management unit may perform bad block management of the memory device 150. The management unit may find bad memory blocks in the memory device 150, which are in unsatisfactory condition for further use, as well as perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. The bad blocks may seriously aggravate the utilization efficiency of the memory device 150 having a 3D stack structure and the reliability of the memory system 110. Thus, reliable bad block management may enhance or improve performance of the memory system 110.

Figure 3:
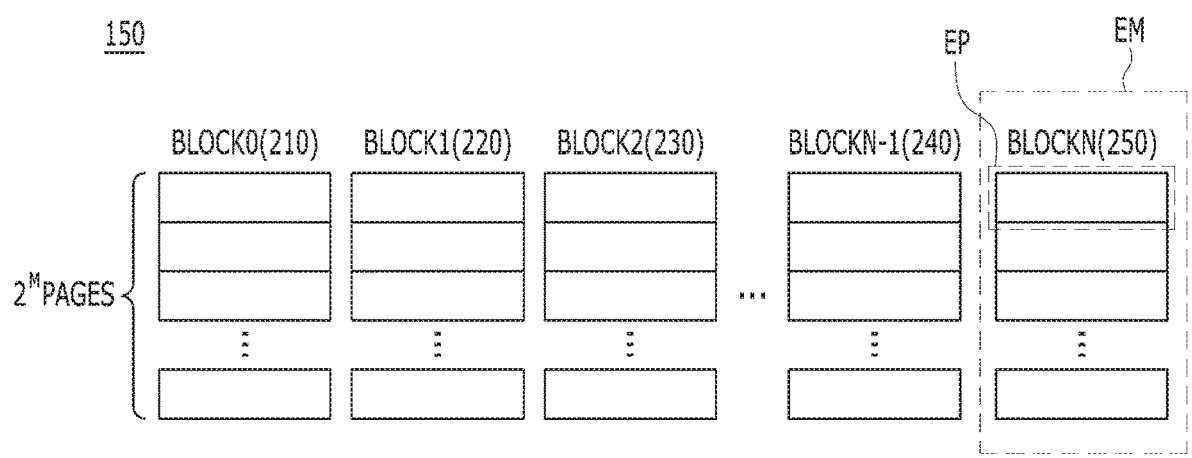
FIG. 3 is a schematic diagram illustrating an exemplary configuration of a memory device of a memory system, such as that shown in FIG. 2.

FIG. 3 is a schematic diagram illustrating a configuration of a memory device, e.g., memory device 150, employed in the memory system of FIG. 2.

Referring to FIG. 3, the memory device 150 may include a plurality of memory blocks BLOCK0 to BLOCKN−1, e.g., BLOCK0 (210), BLOCK1 (220), BLOCK2 (230), and to BLOCKN−1 (240). Each of the memory blocks 210, 220, 230 and 240 may include a plurality of pages, for example $2^M$ pages, the number of which may vary according to circuit design. For example, in some applications, each of the memory blocks may include M pages. Each of the pages may include a plurality of memory cells that are coupled to a word line WL.

In accordance with an embodiment, the memory device 150 further includes an erased memory block EM and an erased page EP which have an erased state. The erased memory block EM and the erased page EP are not used for storing data. In an embodiment of the present invention, erase information E_INF includes an erase physical address EPA of the erase memory block EM or the erase page EP, and erase state information having a set value (e.g., PA_FFFF or 0#0#).

The erased memory block EM and the erased page EP may be designated during the manufacturing process of a semiconductor device or during a booting of the memory system. In addition, the erased memory block EM and the erased page EP may be designated during the operation of the memory system. For example, the erased memory block EM and the erased page EP may include a bad block or bad page of a bad block respectively that are not used to store data. In addition, the erased memory block EM and the erased page EP may include a spare memory block or page of a spare memory block that are not used to store data. However, the erased memory block EM and erased page EP of the present invention are not limited thereto. Moreover, the erased memory block EM may represent more than one EM, and the erased page EP may represent more than one EP.

Accordingly, when the memory system 110 receives an erase request E_REQ for an erase operation with a first logical address corresponding to the erase request E_REQ, the memory system 110 may search for a physical address corresponding to the first logical address in the controller map data and invalidate such physical address found in the search, and map the first logical address to an erase physical address EPA. This is an operation for indicating that the data relating to the first logical address is erased when a read request is subsequently received after the memory system 110 performs an operation according to the erase request E_REQ.

Furthermore, each of a plurality of memory blocks included in the memory device 150 may be implemented with a single level cell (SLC) memory block and a multi-level cell (MLC) memory block capable of storing two or more bits in one memory cell of that block. Some examples of MLC memory blocks are a double level cell memory block (to which the designation MLC memory block is sometimes applied in a more specific sense), a triple level cell (TLC) memory block, and a quadruple level cell (QLC) memory block.

In accordance with an embodiment of the present invention, the memory device 150 may be a non-volatile memory, such as a flash memory, e.g., a NAND flash memory. However, the memory device 150 may be realized as any of a Phase Change Random-access Memory (PCRAM), a Resistive Random-access Memory (RRAM or ReRAM), a Ferroelectric Random-access Memory (FRAM), a Spin Transfer Torque Magnetic Random-access Memory (STT-RAM or STT-MRAM) and the like.

The memory blocks 210, 220, 230, ... 240 may store the data transferred from a host through a program operation, and transfer data stored therein to the host through a read operation.

Figure 4:
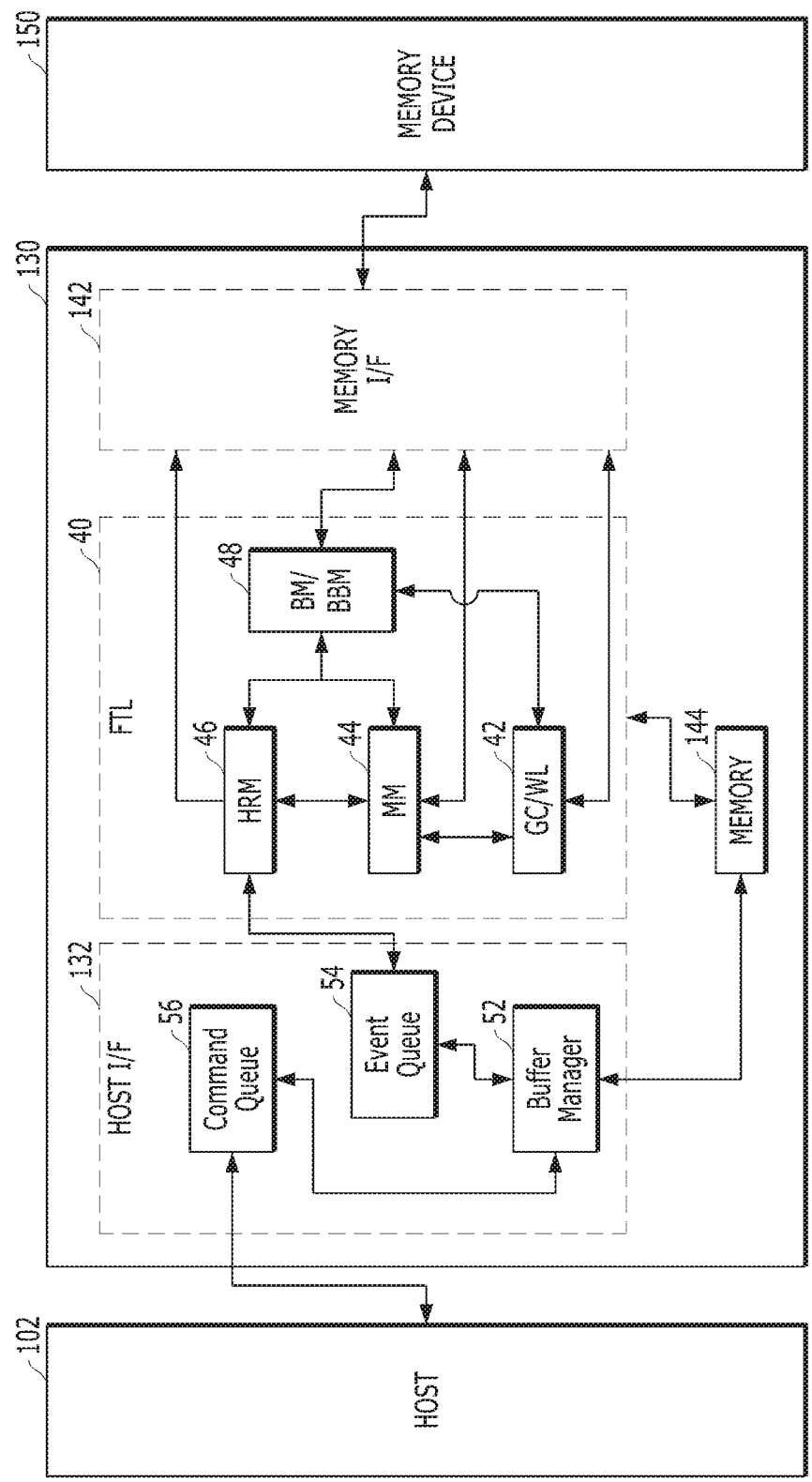
FIG. 4 illustrates a memory system in accordance with an embodiment of the present invention.

Referring to FIG. 4, a controller in a memory system in accordance with another embodiment of the disclosure is described in detail. The controller 130 cooperates with the host 102 and the memory device 150. As illustrated, the controller 130 includes a host interface 132, a flash translation layer (FTL) 40, as well as the host interface 132, the memory interface 142 and the memory 144 previously identified in connection with FIG. 2.

Although not shown in FIG. 4, in accordance with an embodiment, the ECC unit 138 described in FIG. 2 may be included in the flash translation layer (FTL) 40. In another embodiment, the ECC unit 138 may be implemented as a separate module, a circuit, firmware or the like, which is included in, or associated with, the controller 130.

The host interface 132 is for handling commands, data, and the like transmitted from the host 102. By way of example but not limitation, the host interface 132 may include a command queue 56, a buffer manager 52 and an event queue 54. The command queue 56 may sequentially store commands, data, and the like received from the host 102 and output them to the buffer manager 52 in an order in which they are stored. The buffer manager 52 may classify, manage or adjust the commands, the data, and the like, which are received from the command queue 56. The event queue 54 may sequentially transmit events for processing the commands, the data, and the like received from the buffer manager 52.

A plurality of commands or data of the same characteristic, e.g., read or write commands, may be transmitted from the host 102, or commands and data of different characteristics may be transmitted to the memory system 110 after being mixed or jumbled by the host 102. For example, a plurality of commands for reading data (read commands) may be delivered, or commands for reading data (read command) and programming/writing data (write command) may be alternately transmitted to the memory system 110. The host interface 132 may store commands, data, and the like, which are transmitted from the host 102, to the command queue 56 sequentially. Thereafter, the host interface 132 may estimate or predict what kind of internal operation the controller 130 will perform according to the characteristics of commands, data, and the like, which have been received from the host 102. The host interface 132 can determine a processing order and a priority of commands, data and the like, based at least on their characteristics. According to characteristics of commands, data, and the like transmitted from the host 102, the buffer manager 52 in the host interface 132 is configured to determine whether the buffer manager should store commands, data, and the like in the memory 144, or whether the buffer manager should deliver the commands, the data, and the like into the flash translation layer (FTL) 40. The event queue 54 receives events, from the buffer manager 52, which are to be internally executed and processed by the memory system 110 or the controller 130 in response to the commands, the data, and the like transmitted from the host 102, so as to deliver the events into the flash translation layer (FTL) 40 in the order received.

In accordance with an embodiment, the host interface 132 described in FIG. 4 may perform some functions of the controller 130 described in FIGS. 1 and 2. The host interface 132 may set the first memory 104 in the host 102 as a slave and add the first memory 104 as an additional storage space which is controllable or usable by the controller 130.

In accordance with an embodiment, the flash translation layer (FTL) 40 can include a host request manager (HRM) 46, a map manager (MM) 44, a state manager (GC/WL) 42 and a block manager (BM/BBM) 48. The host request manager (HRM) 46 can manage the events entered from the event queue 54. The map manager (MM) 44 can handle or control a map data. The state manager 42 can perform garbage collection (GC) and/or wear leveling (WL). The block manager 48 can execute commands or instructions onto a block in the memory device 150.

By way of example but not limitation, the host request manager (HRM) 46 can use the map manager (MM) 44 and the block manager 48 to handle or process requests according to the read and program commands, and events which are received from the host interface 132. The host request manager (HRM) 46 can send an inquiry request to the map data manager (MM) 44, to determine a physical address corresponding to the logical address which is entered with the events. The host request manager (HRM) 46 can send a read request with the physical address to the memory interface 142, to process the read request (handle the events). On the other hand, the host request manager (HRM) 46 can send a program request (write request) to the block manager 48, to program data to a specific empty page (no data) in the memory device 150, and then, can transmit a map update request corresponding to the program request to the map manager (MM) 44, to update an item relevant to the programmed data in information of mapping the logical-physical addresses to each other.

Here, the block manager 48 can convert a program request delivered from the host request manager (HRM) 46, the map data manager (MM) 44, and/or the state manager 42 into a flash program request used for the memory device 150, to manage flash blocks in the memory device 150. In order to maximize or enhance program or write performance of the memory system 110 (see FIG. 2), the block manager 48 may collect program requests and send flash program requests for multiple-plane and one-shot program operations to the memory interface 142. In an embodiment, the block manager 48 sends several flash program requests to the memory interface 142 to enhance or maximize parallel processing of the multi-channel and multi-directional flash controller.

On the other hand, the block manager 48 can be configured to manage blocks in the memory device 150 according to the number of valid pages, select and erase blocks having no valid pages when a free block is needed, and select a block including the least number of valid pages when it is determined that garbage collection is necessary. The state manager 42 can perform garbage collection to move the valid data to an empty block and erase the blocks containing the moved valid data so that the block manager 48 may have enough free blocks (empty blocks with no data). If the block manager 48 provides information regarding a block to be erased to the state manager 42, the state manager 42 could check all flash pages of the block to be erased to determine whether each page is valid. For example, to determine validity of each page, the state manager 42 can identify a logical address recorded in an out-of-band (OOB) area of each page. To determine whether each page is valid, the state manager 42 can compare the physical address of the page with the physical address mapped to the logical address obtained from the inquiry request. The state manager 42 sends a program request to the block manager 48 for each valid page. A mapping table can be updated through the update of the map manager 44 when the program operation is complete.

The map manager 44 can manage a logical-physical mapping table. The map manager 44 can process requests such as queries, updates, and the like, which are generated by the host request manager (HRM) 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant mapping table stored in the memory device 150. When the number of dirty cache blocks in the map manager 44 exceeds a certain threshold, a program request can be sent to the block manager 48 so that a clean cache block is made and the dirty map table may be stored in the memory device 150.

On the other hand, when garbage collection is performed, the state manager 42 copies valid page(s) into a free block, and the host request manager (HRM) 46 can program the latest version of the data for the same logical address of the page and currently issue an update request. When the status manager 42 requests the map update in a state in which copying of valid page(s) is not completed normally, the map manager 44 may not perform the mapping table update. It is because the map request is issued with old physical information if the status manger 42 requests a map update and a valid page copy is completed later. The map manager 44 may perform a map update operation to ensure accuracy only if the latest map table still points to the old physical address.

In accordance with an embodiment, at least one of the state manager 42, the map manager 44 or the block manager 48 can include suitable circuitry for performing its own operation. As used in the disclosure, the term "circuitry" refers to any and all of the following: (a) hardware-only circuit implementations (such as implementations in only analog and/or digital circuitry) and (b) to combinations of circuits and software (and/or firmware), such as (as applicable): (i) a combination of processor(s) or (ii) portions of processor(s)/software (including digital signal processor(s)), software, and memory(ies) that work together to cause an apparatus, such as a mobile phone or server, to perform various functions) and (c) circuits, such as a microprocessor (s) or portion thereof, that require software or firmware for operation, even if the software or firmware is not physically present. This definition of "circuitry" applies to all uses of this term in this application, including in any claims. As a further example, as used in this specification, the term "circuitry" also covers an implementation of merely a processor (or multiple processors) or portion of a processor and its (or their) accompanying software and/or firmware. The term "circuitry" also covers, for example, and if applicable to a particular claim element, an integrated circuit for a storage device.

In an embodiment of the present disclosure, the host interface 132 may receive an erase request R_REQ for an erase operation from the host 102 with a logical address relating to the erase request. The map data manager 44 may correspond the logical address received from the host 102 to the erase information E_INF. The host interface 132 may transmit a response ACK of the erase request R_REQ to the host 102. The erase information E_INF may include an erase physical address EPA of an erase memory block EM or an erase page EP in an erased state. In addition, the erase information E_INF may include an erase state value EV.

After the map data manager 44 corresponds the logical address with the erase information E_INF, the block manager 48 does not use the erase memory block EM or the erase page EP for storing data. The state manager 42 may search for a physical address corresponding to logical address in the map data, and may invalidate the physical address found in the search. In addition, state manager 42 may perform garbage collection on invalidated physical addresses in an idle state of the memory device 150. The host interface 132 sends a response ACK of the erase request R_REQ to the host 102 before the state manager 42 performs the garbage collection on the invalidated physical address corresponding to the logical address. If a valid physical address corresponding to the logical address with the erase request R_REQ is further received from the host 102, the status manager 42 may invalidate the received valid physical address in the map data. The state manager 42 may perform garbage collection on the invalidated physical address.

When a received logical address from the host 102 corresponds to the erase information E_INF, the host interface 132 may transmit to the host 102 a message indicating that no data relating to the first logical address is stored in the memory device in response to the read request. When a received logical address from the host 102 corresponds to the erase information E_INF, the host interface 132 may transmit to the host 102 a message that no data relating to the second logical address is found in the memory device in response to the read request.

The memory device 150 can include a plurality of memory blocks. The plurality of memory blocks can be any of different types of memory blocks such as a single level cell (SLC) memory block, a multi level cell (MLC) Cell) memory block or the like, according to the number of bits that can be stored or represented in one memory cell. Here, the SLC memory block includes a plurality of pages implemented by memory cells, each storing one bit of data. The SLC memory block can have high data I/O operation performance and high durability. The MLC memory block includes a plurality of pages implemented by memory cells, each storing multi-bit data (e.g., two bits or more). The MLC memory block can have larger storage capacity for the same space compared to the SLC memory block. The MLC memory block can be highly integrated in terms of storage capacity. In an embodiment, the memory device 150 may be implemented with MLC memory blocks such as an MLC memory block, a triple level cell (TLC) memory block, a quadruple level cell (QLC) memory block or a combination thereof. The MLC memory block may include a plurality of pages implemented by memory cells, each capable of storing 2-bit data. The triple level cell (TLC) memory block can include a plurality of pages implemented by memory cells, each capable of storing 3-bit data. The quadruple level cell (QLC) memory block can include a plurality of pages implemented by memory cells, each capable of storing 4-bit data. In another embodiment, the memory device 150 can be implemented with a block including a plurality of pages implemented by memory cells, each capable of storing 5-bit or more bit data.

In an embodiment of the disclosure, the memory device 150 is embodied as a nonvolatile memory such as a flash memory such as a NAND flash memory, a NOR flash memory and the like. Alternatively, the memory device 150 may be implemented by at least one of a phase change random access memory (PCRAM), a ferroelectrics random access memory (FRAM), a spin injection magnetic memory (STT-RAM), and a spin transfer torque magnetic random access memory (STT-MRAM), or the like.

Figure 5:
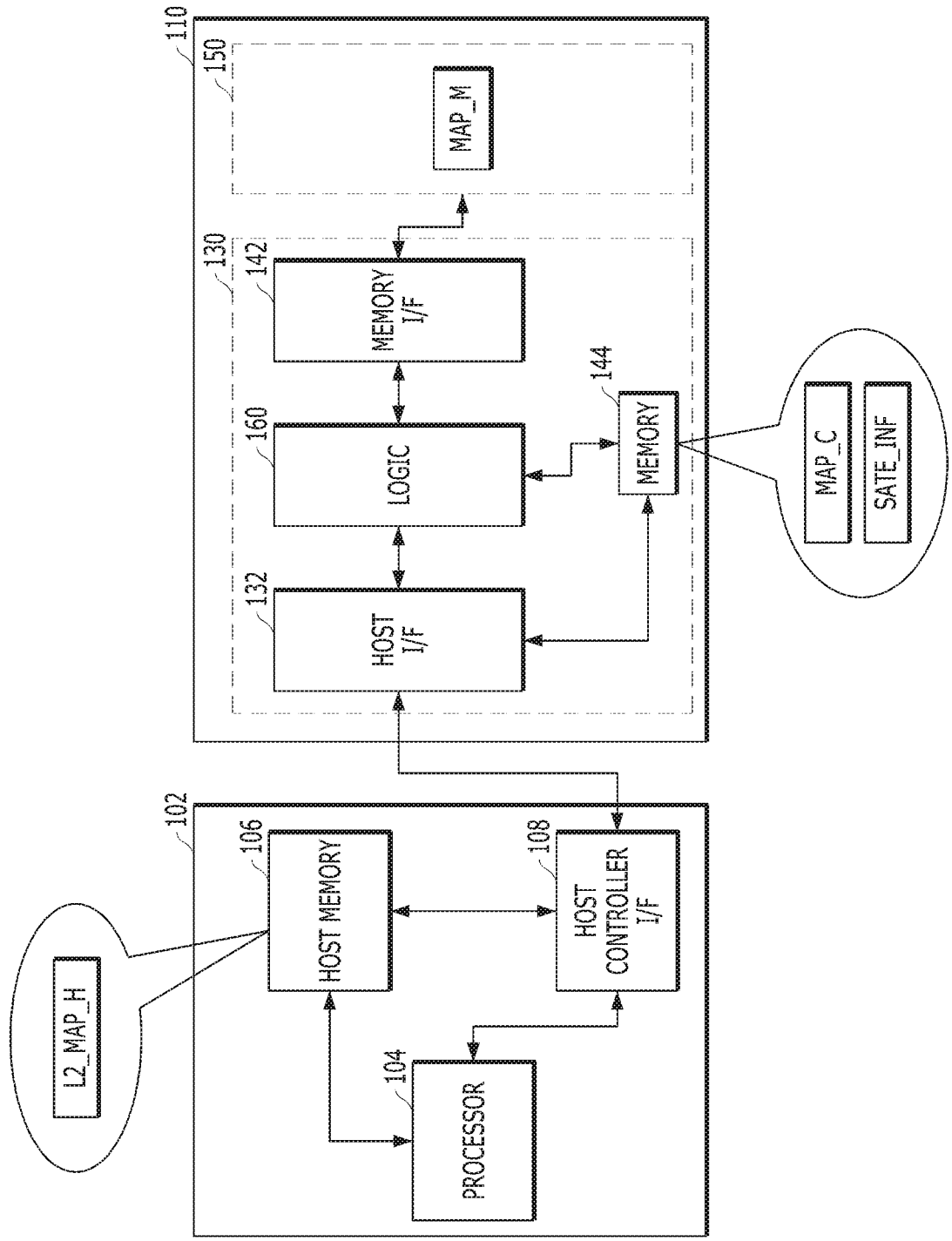
FIG. 5 illustrates a configuration in which part of memory in a host is used as a cache device for storing metadata used in a memory system, such as that shown in FIG. 2.
Figure 6A:
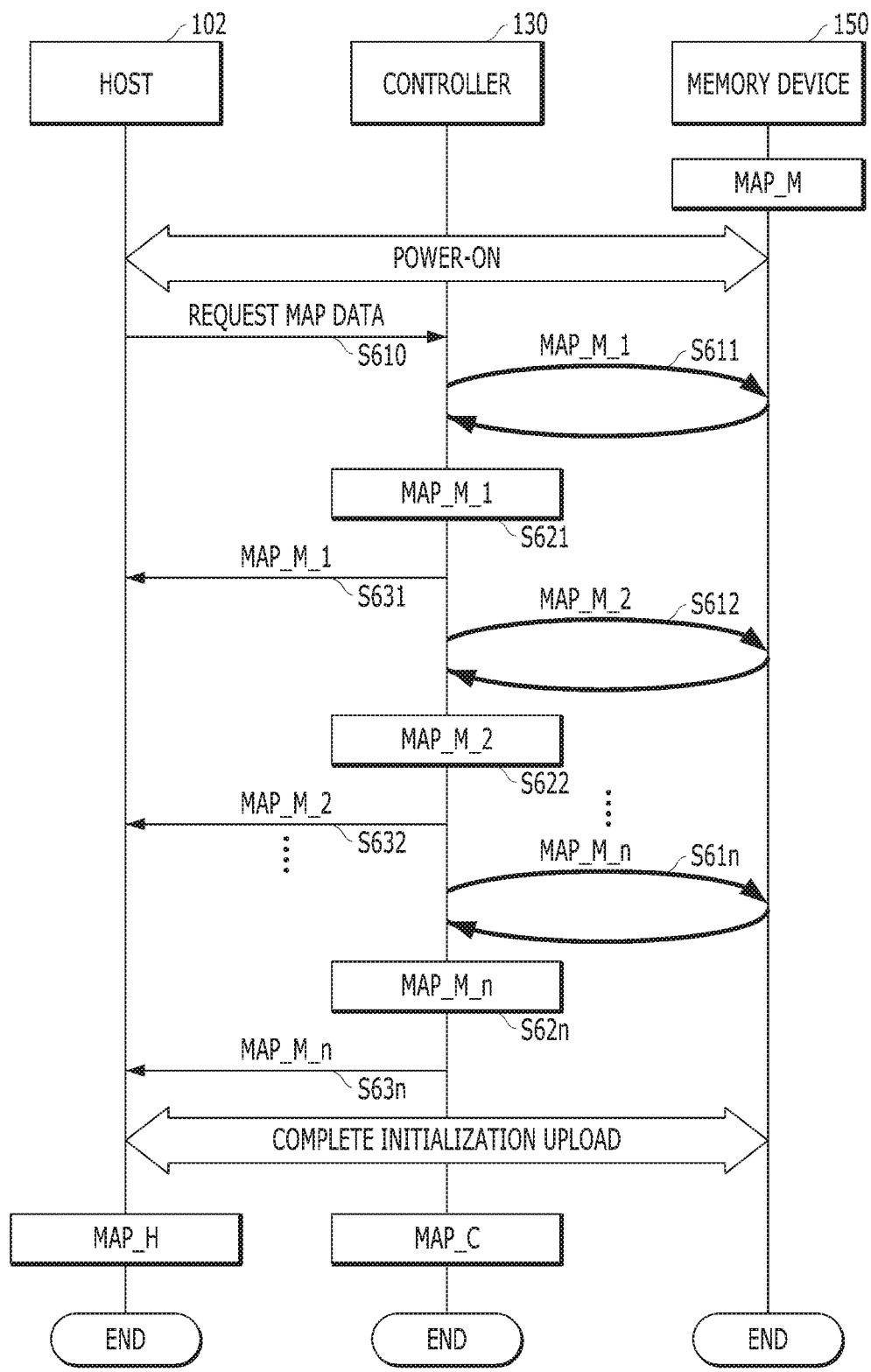
FIGS. 6A and 6B illustrates examples of managing map data in a memory system and a data processing system.
Figure 6B:
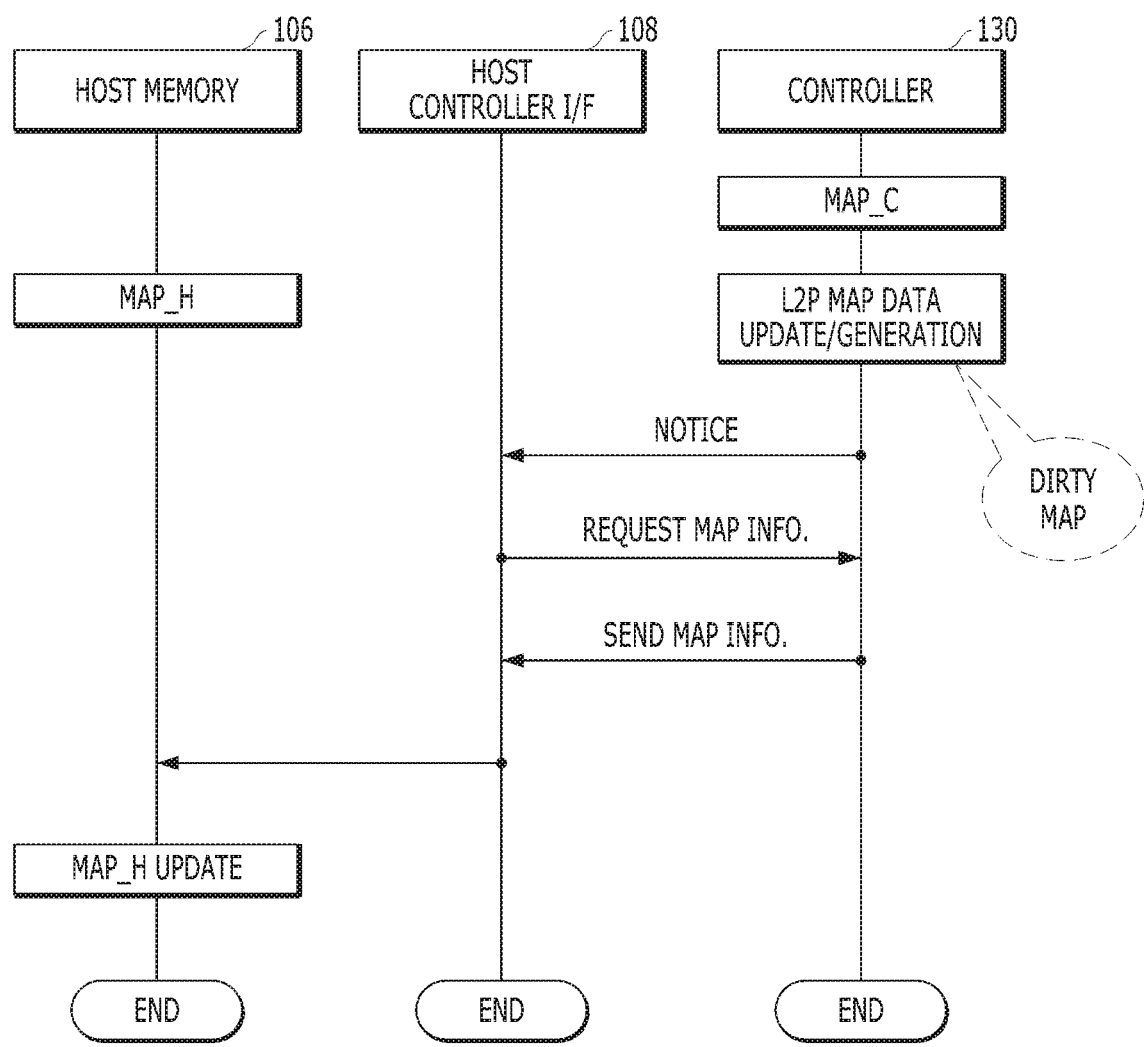

FIGS. 5 to 6B illustrate a case where a part of a memory included in a host can be used as a cache device for storing metadata used in the memory system.

FIG. 5 illustrates a case where a part of memory included in a host can be used as a cache device for storing metadata used in the memory system. The metadata may comprise map data including a controller map data MAP_C used in the memory system.

Referring to FIG. 5, the host 102 may include a processor 104, a memory 106, and a host controller interface 108. The memory system 110 may include a controller 130 and a memory device 150. Herein, the controller 130 and the memory device 150 described in FIG. 5 may correspond to the controller 130 and the memory device 150 described in FIGS. 1 to 4.

Accordingly, the following description focuses on the difference between the controller 130 and the memory device 150 shown in FIG. 5 and the controller 130 and the memory device 150 shown in FIGS. 1 to 4. Particularly, a logic block 160 in the controller 130 may correspond to the flash translation layer (FTL) 40 described in FIG. 4. However, in accordance with an embodiment, the logic block 160 in the controller 130 may serve an additional role and perform an additional function.

The processor 104 has a higher performance than that of the memory system 110, and the host memory 106 is capable of storing a larger amount of data than that of the memory system 110. The processor 104 and the host memory 106 in the host 102 can have an advantage in terms of space and capability. For example, the processor 104 and the host memory 106 may have more resources than the processor 134 and the memory 144 in the memory system 110. Process capabilities of the processor 104 and the host memory 106 can be are greater than the processor 134 and the memory 144 in the memory system 110. In an embodiment, the memory system 110 can utilize the resources possessed by the host 102 in order to increase the operation efficiency of the memory system 110.

As an amount of data which can be stored in the memory system 110 increases, an amount of metadata relating to the data stored in the memory system 110 also increases. When storage capability used to load the metadata in the memory 144 of the controller 130 is limited or restricted, the increase in an amount of loaded metadata may cause an operational burden on operations of the controller 130. For example, because of limitation of space or region allocated for metadata in the memory 144 of the controller 130, part, but not all, of the metadata may be loaded. If loaded metadata does not include specific metadata for a physical location to which the host 102 is intended to access, the controller 130 stores the loaded metadata back into the memory device 150 if some of the loaded metadata has been updated, as well as load the specific metadata for the physical location to which the host 102 is intended to access. These operations should be performed for the controller 130 to perform a read operation or a write operation requested by the host 102, and may degrade performance of the memory system 110.

Storage capability of the host memory 106 included in the host 102 may be tens or hundreds of times larger than that of the memory 144 included in the controller 130. The memory system 110 may transfer controller map data MAP_C used by the controller 130 to the host memory 106 in the host 102 so that at least some part of the host memory 106 in the host 102 may be accessed by the memory system 110. The controller map data MAP_C transmitted to the host 102 is stored as host map data MAP_H in the host memory 106. The accessible part of the host memory 106 can be used as a cache memory for address translation required for reading or writing data in the memory system 110. In this case, the host 102 translates a logical address into a physical address based on the host map data MAP_H stored in the host memory 106 instead of transmitting the logical address along with a request, a command or an instruction to the memory system 110. Then, the host 102 can transmit the translated physical address with the request, the command or the instruction to the memory system 110. The memory system 110, which receives the translated physical address with the request, the command or the instruction, may skip an internal process of translating the logical address into the physical address and access the memory device 150 based on the physical address transferred. In this case, overhead (e.g., operational burden) that the controller 130 would experience in loading metadata from the memory device 150 for the address translation may be eliminated, and operational efficiency of the memory system 110 can be enhanced.

On the other hand, even if the memory system 110 transmits the host map data MAP_H to the host 102, the memory system 110 can control mapping information based on the host map data MAP_H such as metadata generation, erase, update and the like. The controller 130 in the memory system 110 may perform a background operation such as garbage collection and wear leveling according to an operation state of the memory device 150 and may determine a physical address, i.e., which physical location in the memory device 150 data transferred from the host 102 is stored. Since a physical address of data stored in the memory device 150 may be changed and the host 102 does not know the changed physical address, the memory system 110 may update the host map data MAP_H base on the changed physical address.

While the memory system 110 controls metadata used for the address translation, it can be determined that the memory system 110 needs to modify or update the host map data MAP_H previously transmitted to the host 102. The memory system 110 can send a signal or a metadata to the host 102 to request the update of the host map data MAP_H stored in the host 102. The host 102 may update the stored host map data MAP_H in the host memory 106 in response to a request received from the memory system 110. This corresponds the host map data MAP_H stored in the host memory 106 in the host 102 to be kept as the latest version such that, even though the host controller interface 108 uses the host map data MAP_H stored in the host memory 106, no problem is encountered in an operation in which a logical address is translated into a physical address and the translated physical address is transmitted along with the logical address to the memory system 110.

The host map data MAP_H stored in the host memory 106 may include mapping information used for translating a logical address into a physical address. Metadata associating a logical address with a physical address may include two distinguishable items: a first mapping information item used for translating a logical address into a physical address; and a second mapping information item used for translating a physical address into a logical address. The host map data MAP_H stored in the host memory 106 may include the first mapping information. The second mapping information can be primarily used for internal operations of the memory system 110, but may not be used for operations requested by the host 102 to store data in the memory system 110 or read data relating to a particular logical address from the memory system 110. In an embodiment, the second mapping information item may not be transmitted by the memory system 110 to the host 102.

The controller 130 in the memory system 110 can control (e.g., create, delete, update, etc.) the first mapping information item or the second mapping information item, and store either the first or second mapping information item to the memory device 150. Since the host memory 106 in the host 102 is a type of volatile memory, the host map data MAP_H stored in the host memory 106 may disappear when the supply of power to the host 102 and the memory system 110 is disrupted or cut. Accordingly, the controller 130 in the memory system 110 can not only keep the latest state of the host map data MAP_H stored in the host memory 106 of the host 102, but also store the latest state of the first mapping information item or the second mapping information item in the memory device 150.

The memory 144 may be disposed in or external to the controller 130. The memory 144 may store a controller map data MAP_0 and status information STATE_INF.

The state information STATE_INF indicates a particular state, among multiple possible states, of the memory device 150, and may be generated and managed in units of map segments included in the controller map data MAP_C. The state information STATE_INF may be in a bitmap form, a counter form, a flag form, a table form, or a list form. When the state information STATE_INF is in a bitmap form, the storage space occupied by the state information STATE_INF in the memory 144 is small, and the burden on the controller 130 to access the state information STATE_INF can be reduced.

The status information STATE_INF may include dirty information D_INF, invalid address information INV_INF, valid page counter information VPC, free block count information nFB and/or erase state information.

The dirty information D_INF may include information about whether or not a physical address indicating a physical storage location of data relating to a logical address is changed. In the process of performing a background operation e.g., garbage collection or wear leveling, the memory system 110 may update the map data in response to a change of the physical address corresponding to the logical address in the memory device 150. The controller 130 may reflect the change of the physical address to the dirty information D_INF. The dirty information D_INF has an initial value of a first level, e.g., 0 and is updated to a second level, e.g., 1 when the physical address corresponding to the logical address is changed. That is, the status value '0' of the dirty information D_INF may represent that the physical address corresponding to the logical address is not changed. The status value '1' of the dirty information D_INF may indicate that the physical address corresponding to the logical address has changed. The memory system according to an embodiment of the present disclosure may determine the validity of a physical address received together with a request from the host 102 using the dirty information D_INF.

The invalid address information INV_INF may include information on an invalid physical address, which may result by changing a physical storage location of data relating to a logical address, by the unmap operation, or by an erasing operation of a data relating to a logical address. The invalid address information INV_INF has an initial value of a first level e.g., 0 and is updated to a second level e.g., 1 when the physical address is invalidated. That is, the status value '0' of the invalid address information INV_INF may represent that the physical address is in a valid state. The status value '1' of the invalid address information INV_INF may represent that the physical address is in an invalid state. In an embodiment of the present invention, the memory system may invalidate the physical address according to an erase request E_REQ including a sanitize request, a secure request, a TRIM request, a delete request, an unmap request, a discard request and/or a format request for an erase operation. The memory system according to an embodiment of the present disclosure may determine the validity of a physical address received together with a request from the host 102 using the invalid address information INV_INF.

The valid page counter information VPC may include information about the number of valid pages in the memory block. When one page in a memory block is changed from a valid state to an invalid state, the memory system may reduce the number of valid pages VPC of the corresponding memory block by one. The memory system 110 may perform a garbage collection GC operation on a memory block having a valid page count VPC less than a set value. In addition, the memory system 110 may perform an erase operation to the memory block having an effective page count VPC of '0' to generate a clean block, thereby increasing the utilization of the memory device 150.

The free block number information nFB may include the number of memory blocks including only pages in an erased state in which data is not programmed or written. According to an embodiment of the present invention, when the number of free blocks nFB is less than or equal to the set number nFB_TH, the memory system may perform garbage collection.

The erase state information may include information on whether the data relating to the logical address is erased. When the data relating to the logical address is erased, the controller 130 may reflect the erase state information of the logical address. The erase state information has an initial value of a first level, e.g., 0, and when the data relating to the logical address is erased, the erase state information may be changed to the erase state value EV, e.g., 0#0#. The memory system according to an embodiment of the present disclosure may determine whether data relating to a logical address received with a read request from the host 102 is in an erased state by using the erase state information.

FIG. 6A is a flowchart illustrating a method in which the memory system 110 sends all or a portion of the memory map data MAP_M to the host 102 at power-on. Referring to 6A, the controller 130 loads some or all of a memory map data MAP_M stored in the memory device 150 and transmits memory map data MAP_M to the host 102 at power-on. Upon power-on, the host 102, the controller 130, and the memory device 150 may start an initialization uploading operation of map data.

In step S610, the host 102 may request map data from the controller 130. For example, the host 102 may designate and request a specific portion of the map data. For example, the host 102 may designate and request a portion of the map data, in which data to drive the data processing system 100, such as a file system, a boot image, and/or an operating system, is stored. As another example, the host 102 may request map data from the controller 130 without any designation.

In step S611, the controller 130 may read a first portion MAP_M_1 of the memory map data MAP_M from the memory device 150. In step S621, the first portion MAP_M_1 may be stored in the controller 130 as the controller map data MAP_C. In step S631, the controller 130 may send the first portion MAP_M_1, which is stored as the controller map data MAP_C, to the host 102. The first portion MAP_M_1 may be stored in the host memory 106 as the host map data MAP_H.

In step S612, the controller 130 may read a second portion MAP_M_2 of the memory map data MAP_M from the memory device 150. In step S622, the second portion MAP_M_2 may be stored in the controller 130 as the controller map data MAP_C. In step S632, the controller 130 may send the second portion MAP_M_2, which is stored as the controller map data MAP_C, to the host 102. The second portion MAP_M_2 may be stored in the host memory 106 as the host map data MAP_H, by the host 102.

In step S61$n$, the controller 130 may read an $n^{th}$ portion MAP_M_n of the memory map data MAP_M from the memory device 150. In step S62$n$, the n portion MAP_M_n may be stored in the controller 130 as the controller map data MAP_C. In step S63$n$, the controller 130 may send the n$^{th}$ portion MAP_M_n, which is stored as the controller map data MAP_C, to the host 102. The n$^{th}$ portion MAP_M_n may be stored in the host memory 106 as the host map data MAP_H, by the host 102. Consequently, the host 102, the controller 130, and the memory device 150 may complete initialization upload of the map data.

The controller 130 in FIG. 6A downloads a part of the memory map data MAP_M a plurality of times and uploads the downloaded memory map data MAP_M to the host 102 a plurality of times in response to a single request of map data received from the host 102 in S610. However, the controller 130 may upload all of the memory map data MAP_M to the host 102 in response to a single request of map data received from the host 102. The controller 130 may upload a part of the memory map data MAP_M to the host 102 a plurality of times in response to a plurality of requests of the map data received from the host 102.

As described above, the controller map data MAP_C is stored in the memory 144 of the controller 130, and the host map data MAP_H is stored in the host memory 106 of the host 102.

If the initialization uploading of the map data is completed, the host 102 may cooperate with the memory system 110 to access the memory system 110. An embodiment is illustrated in FIG. 6A as the host 102 and the memory system 110 perform the initialization upload. However, the present invention is not limited thereto. For example, the initialization upload may be omitted. The host 102 may access the memory system 110 without the initialization upload.

After the map data initial uploading operation, uploading and updating the memory map data MAP_M may be performed in response to a host request or may be performed under the control of the controller 130 without a host request. The uploading and updating operation of the memory map data MAP_M may be performed in part or in whole, or periodically.

FIG. 6B illustrates a process of updating map data between the memory system 110 and the host 102 according to an embodiment of the invention. In particular, FIG. 6B illustrates a process of updating the host map data MAP_H by uploading some or all of the map data stored in the controller 130 to the host 102 under the control of the controller 130.

The memory system 110 electrically coupled with the host 102 can perform a read operation, a write operation, and an erase operation requested by the host 102. After the memory system 110 performs a read operation, a write operation, or a erase operation requested by host 102, the memory system 110 can update the map data when a physical location of the data stored in the memory device 150 is changed.

Further, in the course of performing a background operation (e.g., garbage collection or wear leveling) which is not requested by the host 102, the memory system 110 can update the map data in response to a change in the physical location of data stored in the memory device 150. The controller 130 in the memory system 110 can detect whether map data is updated through the above-described operation. That is, the controller 130 can check whether there is a dirty map which is caused through generation, update or delete of the map data and dirty information D_INF included in state information STATE_INF.

When the map data becomes dirty, the controller 130 notifies the host controller interface 108 of the need to update the map data previously stored in the host memory 106. The host controller interface 108 may request the controller 130 for map data that needs to be updated (REQUEST MAP INFO. shown in FIG. 6B). The controller 130 may send the map data that needs to be updated in response to a request from the host controller interface 108 (SEND MAP INFO. shown in FIG. 6B). Then, the host controller interface 108 delivers the transferred map data to the host memory 106 and updates the previously stored map data (L2P MAP UPDATE shown in FIG. 6B) in the host memory 106.

Figure 7A:
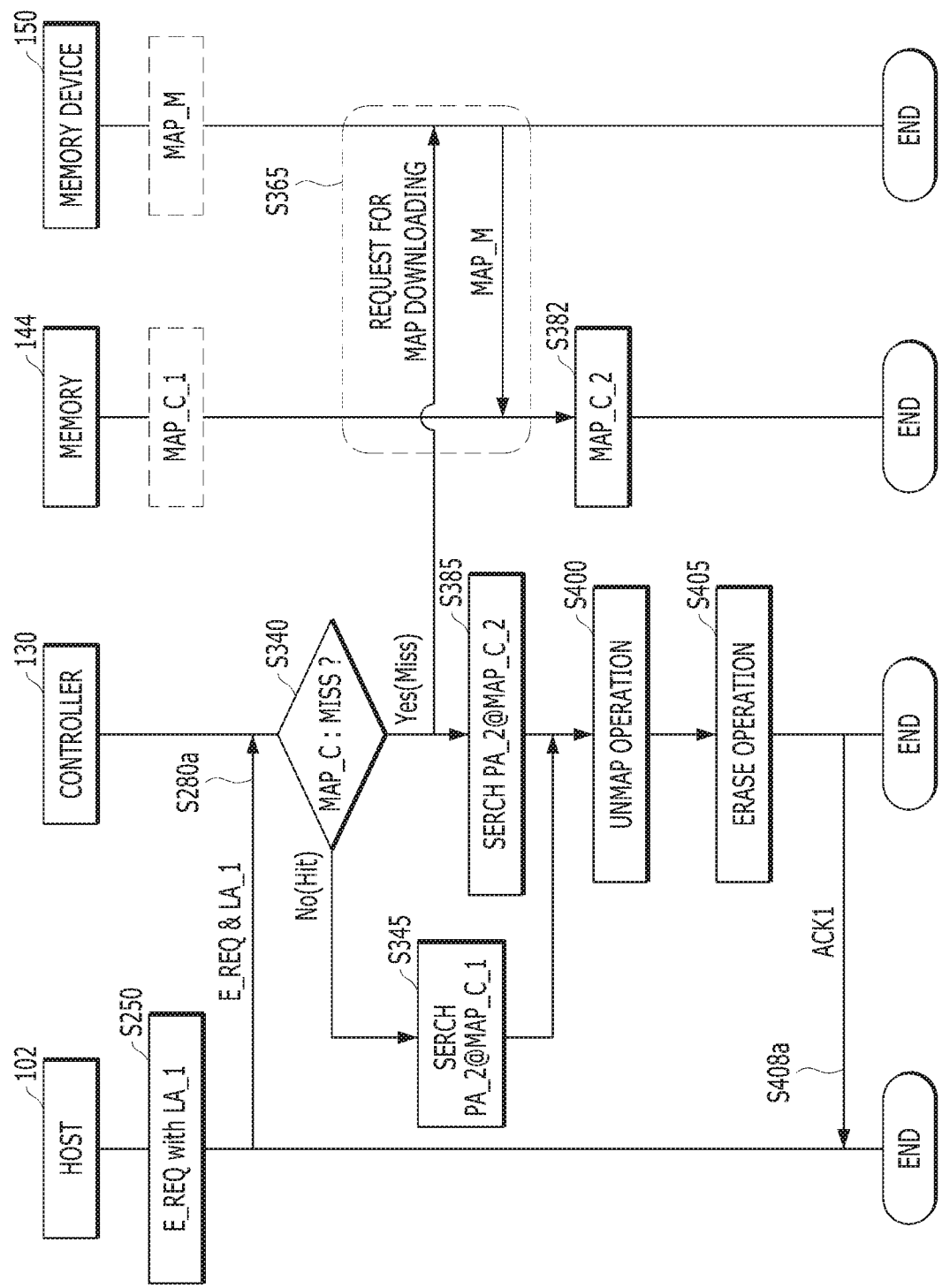
FIGS. 7A and 7B are flowcharts illustrating a method for performing a command operation by a data processing system and a memory system in accordance with an embodiment of the present invention.
Figure 7B:
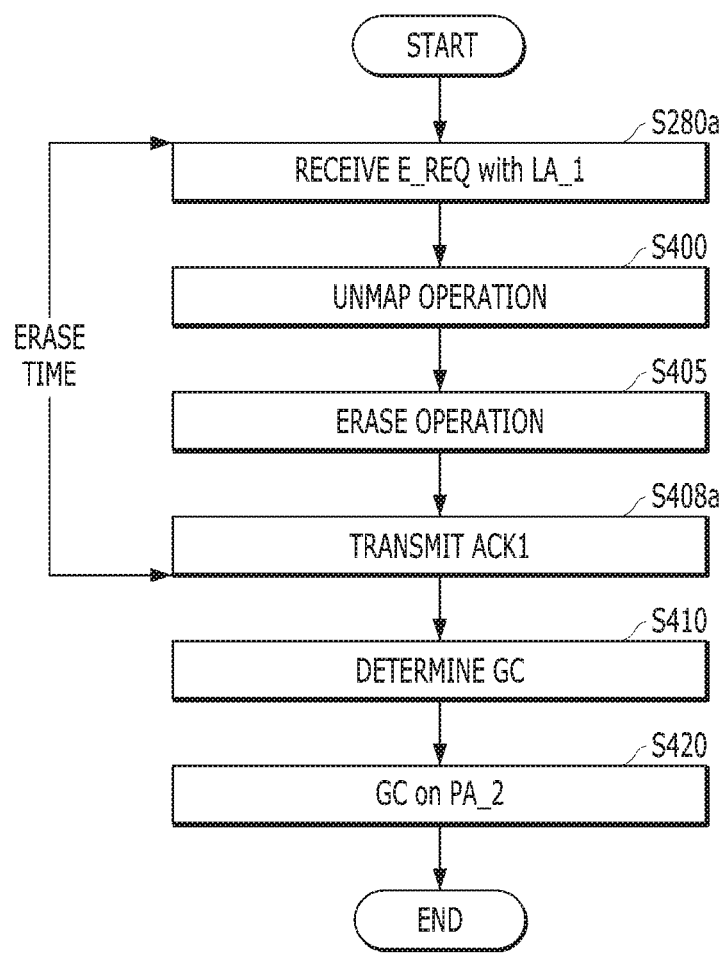

FIG. 7A is a flowchart illustrating a method for reducing erase operation time according to an erase request E_REQ in accordance with an embodiment. FIG. 7B is a flowchart illustrating the erase operation time described with reference to FIG. 7A.

The erase operation for reducing the erase operation time illustrated in FIGS. 7A and 7B may be performed by the data processing system 100 and the memory system 110 illustrated in FIGS. 2 to 4. Particularly, FIGS. 7A and 7B illustrate a method for performing the erase operation time by corresponding a first logical address LA_1 received together with the erase request E_REQ from a host 102 to erase information E_INF. In the present embodiment, a logical address transmitted by the host 102 with the erase request E_REQ to the memory system 110 will be referred to as the "first logical address."

Referring to FIGS. 2 to 4, 7A and 7B, the data processing system 100 according to the present embodiment includes a host 102 and a memory system 110. The host 102 may include a processor 104 and a host controller interface 108, and the memory system 110 may include a controller 130, a memory 144 and a memory device 150.

When power is supplied to the host 102 and the memory system 110 (power-on), the host 102 and the memory system 110 may cooperate with each other. In this case, the controller 130 may download memory map data MAP_M stored in the memory device 150. The controller 130 may store the memory map data MAP_M, downloaded from the memory device 150, as a controller map data MAP_C_1 in the memory 144.

In step S250, the processor in the host 102 generates the erase request E_REQ and the first logical address LA_1 relating to the erase request E_REQ. In step S280a, the host controller interface 108 receives the generated erase request E_REQ and the first logical address LA_1 from the processor 104, and transfers the generated erase request E_REQ and the first logical address LA_1 to the controller 130 in the memory system 110.

In an embodiment, the erase request E_REQ for a corresponding erase operation, which is transmitted from the host 102 to the controller 130, may include a sanitize request, a secure request, a TRIM request, a delete request, an unmap request, a discard request and/or a format request.

In step S340, when the erase request E_REQ and the first logical address LA_1 are received, the controller 130 determines whether or not a map miss occurs in the controller map data MAP_C_1. In other words, the controller 130 determines whether or not map information for the first logical address LA_1 is included in the controller map data MAP_C_1 stored in the memory 144. The map information for the first logical address LA_1 may include a physical address corresponding to the first logical address LA_1.

When the map information for the first logical address LA_1 is included in the controller map data MAP_C_1 (No in S340), the controller 130 determines that a map hit, not a map miss, occurs between the first logical address LA_1 and the controller map data MAP_C_1.

In step S345, the controller 130 may search for a second physical address PA_2 mapped to the first logical address LA_1 in the controller map data MAP_C_1. In step S400, the controller 130 performs an unmap operation on the found second physical address PA_2 and the first logical address LA_1. The unmap operation may include an operation which deactivates or erases the map information of the first logical address in the map data and an invalidation operation on the found second physical address PA_2. In the present embodiment, a physical address corresponding to a logical address transmitted by the host 102 and included in the map data stored in the memory system 110 will be referred to as the "second physical address."

The map information for the first logical address LA_1 is not included in the controller map data MAP_C_1 (Yes in S340), the controller 130 determines that the map miss occurs in the controller map data MAP_C_1. In other words, the controller 130 determines that the second physical address PA_2 mapped to the first logical address LA_1 is not stored in the controller map data MAP_C_1.

In step S365, the controller 130 performs a map downloading operation on the memory map data MAP_M. The controller 130 may request the memory map data MAP_M including the map information for the first logical address LA_1 from the memory device 150. The memory device 150 may transmit the memory map data MAP_M including the map information for the first logical address LA_1 to the controller 130 in response to the request for map downloading received from the controller 130. The controller 130 may store the memory map data MAP_M in the memory 144. Accordingly, the controller map data MAP_C_1 may be updated to controller map data MAP_C_2, in step S382.

In step S385, the controller 130 searches for the second physical address PA_2 mapped to the first logical address LA_1 in the controller map data MAP_C_2 updated. In step S400, the controller 130 may perform the unmap operation on the found second physical address PA_2 and the first logical address LA_1 in the map data. In this case, the controller 130 performs the invalidation operation on the found second physical address PA_2.

In the present embodiment, the controller 130 may change a state value of invalid address information INV_INF corresponding to the second physical address PA_2 from '0' to '1', in order to perform the invalidation operation on the second physical address PA_2 searched for and found in the steps S345 and S385. In addition, the controller 130 may change a state value of valid page count information VPC of a memory block including pages corresponding to the second physical address PA_2.

After performing the unmap operation, in step S405, the controller 130 may perform an erase operation by correlating the first logical address LA_1 to the erase information E_INF.

In the present embodiment, the erase information E_INF may include an erase physical address EPA of an erase page which is in an erase state or an erase memory block which is in an erase state. In addition, the erase information E_INF may include the erase state value EV.

The erase physical address EPA may include a physical location of an erase page EP in an erase state of the memory device 150 included in the memory system 110 or a physical location of the erase memory block EM in an erase state. Also, the erase page EP and the erase memory block EM may not be used for storing data.

The erase state value EV may include a value that has a form of a physical address such as a memory block and a page in the memory device 150. In addition, the erase state value EV may include a specific code value that is not in the form of the physical address.

The erase physical address EPA may include a physical address of the erase memory block EM which is not used for storing data in the memory device 150. Such memory block is the memory block BLOCKN 250 in an erase state, as illustrated in FIG. 3. In addition, the erase physical address EPA may include a physical address of the erase page EP included in the erase memory block EM.

The erase information E_INF according to the present embodiment may include the erase physical address EPA of one erase page EP, regardless of the size of data relating to the first logical address LA_1. For example, when the size of data that may be stored in one page in the memory device 150 is 4 Kbytes, and the size of data relating to the first logical address LA_1 is 1 Gbyte, 2.5 million pages need to be unmapped and a garbage collection needs to be performed, in order to erase the data relating to the first logical address LA_1. Thus, the erase operation time may be increased. However, in the present embodiment, in order to perform an erase command operation on the first logical address LA_1, the 2.5 million pages may be unmapped, and then the first logical address LA_1 may be mapped to one erase physical address EPA or the erase state value EV. Accordingly, the erase operation time may be decreased.

The controller 130 may determine that the erase operation has been completely performed by corresponding the first logical address LA_1 to the erase information E_INF in step S405. Accordingly, the controller 130 may transmit a first response ACK1 in response to the erase request E_REQ to the host 102 in step S408a. The first response ACK1 may include a message indicating that operations for the erase operation according to the erase request E_REQ have been completely performed.

As illustrated in FIG. 7B, the erase operation time according to the present embodiment includes a time required to perform the steps S280a to S408a. That is, the erase operation time includes a time ranging from a time at which the controller 130 receives the erase request E_REQ for the erase operation and the first logical address LA_1 to a time at which the first response ACK1 is transmitted to the host 102.

Subsequently, an erase operation for physically erasing the data stored at the second physical address PA_2 invalidated in step S400 may be performed when the state of the memory system satisfies a condition for performing the garbage collection. The garbage collection may be performed during an idle state of the memory system 110 or at fixed times, which may be periodic. In addition, the garbage collection may be performed when the number of free blocks nFB is less than or equal to a set number nFB_TH or the number of valid pages VPC is less than or equal to a set number VPC_TH.

Figure 8A:
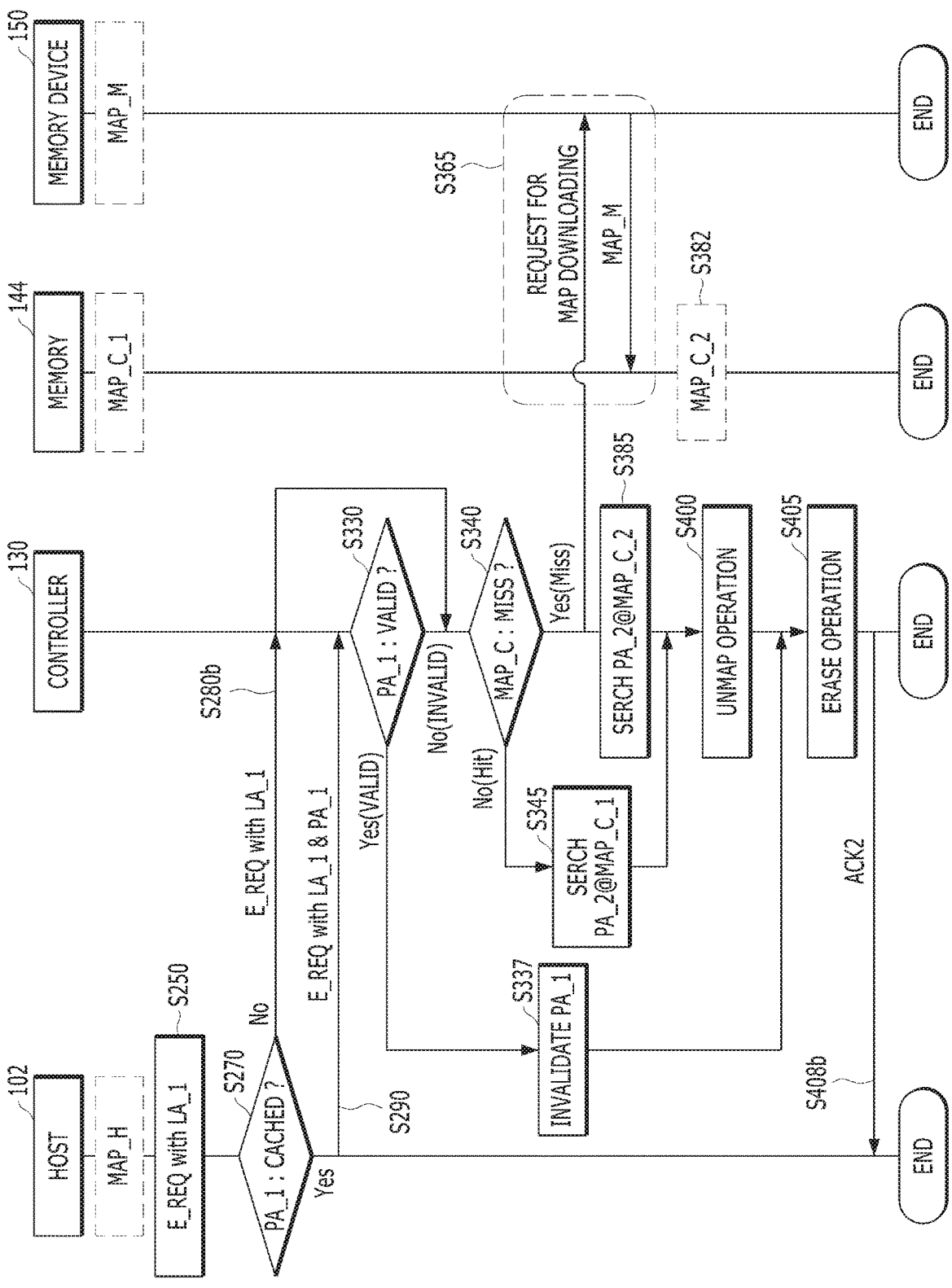
FIGS. 8A and 8B are flowcharts illustrating a method for performing a command operation by a data processing system and a memory system in accordance with an embodiment of the present invention.
Figure 8B:
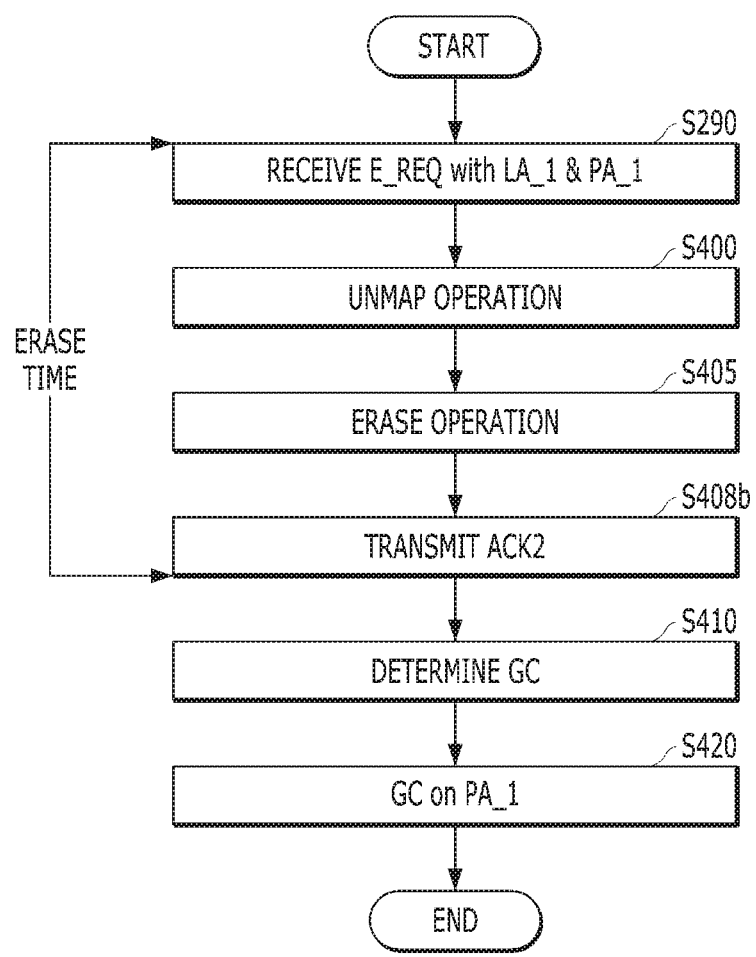

FIGS. 8A and 8B are flowcharts illustrating a method for performing a command operation by a data processing system in response to an erase request E_REQ, for an erase operation, in accordance with an embodiment.

FIG. 8A illustrates a method for executing the command CMD operation in response to the erase request E_REQ in which an erase operation time is reduced, in accordance with an embodiment. FIG. 8B illustrates the erase operation time described with reference to FIG. 8A.

The command CMD operation illustrated in FIGS. 8A and 8B may be performed by the data processing system 100 and the memory system 110 illustrated in FIGS. 5 to 6B. Particularly, FIGS. 8A and 83 illustrate a method for performing a reduced-time erase operation for the erase request E_REQ, by correlating a first logical address LA_1 to erase information E_INF.

Although the host 102 illustrated in FIGS. 2 and 4 does not include a host memory 106, the host 102 illustrated in FIGS. 5 to 63 may include the host memory 106. The erase operation for reducing the erase operation time illustrated in FIGS. 8A and 83 may be performed by the data processing system 100 and the memory system 110 illustrated in FIGS. 5 to 6B. Particularly, FIGS. 8A and 8B illustrate a method for performing the erase operation time by correlating a first logical address LA_1 received together with the erase request E_REQ from a host 102 to erase information E_INF.

When power is supplied to the host 102 and the memory system 110 (power-on), the host 102 and the memory system 110 may communicate. In this case, the controller 130 may download memory map data MAP_M stored in the memory device 150. The controller 130 may store the memory map data MAP_M, downloaded from the memory device 150, as a controller map data MAP_C_1 in the memory 144. The controller 130 may upload the controller map data MAP_C_1 stored in the memory 144, to the host 102. The host 102 may store the controller map data MAP_C_1, received from the controller 130, as host map data MAP_H in the host memory 106. As a result, the host map data MAP_H is stored in the host memory 106, the memory map data MAP_M is stored in the memory device 150, and the controller map data MAP_C_1 is stored in the memory 144 of the controller 130.

The processor 104 in the host 102 generates the erase request E_REQ and the first logical address LA_1 relating to the erase request E_REQ, in step S250. The host controller interface 108 receives the generated erase request E_REQ and first logical address LA_1 from the processor 104, and transfers them to the host memory 106, in step S250.

The host controller interface 108 may determine whether or not a first physical address PA_1 mapped to the first logical address LA_1 is stored, based on map data L2P MAP in the host map data MAP_H stored in the host memory 106, in step S270 (that is, whether "PA_1 cached").

When the first physical address PA_1 mapped to the first logical address LA_1 is not stored in the host map data MAP_H (No in S270), the host controller interface 108 transfers the erase request E_REQ and the first logical address LA_1, without the first physical address PA_1, to the controller 130 in the memory system 110, in step S280b. The host controller interface 108 may include the first logical address LA_1 in a command format of the erase request E_REQ, and transmit the same to the controller 130.

When the first physical address PA_1 mapped to the first logical address LA_1 is stored in the host map data MAP_H (Yes in S270), the host controller interface 108 transfers the first physical address PA_1, together with the erase request E_REQ and the first logical address LA_1, to the controller 130 in the memory system 110, in step S290. The host controller interface 108 may include the first physical address PA_1 in a reserved region of the command format of the erase request E_REQ, and transmit the same to the controller 130.

When the first physical address PA_1 is not received, and only the command CMD and the first logical address LA_1 are received from the host 102, in step S280b, the controller 130 determines whether or not a map miss occurs in the controller map data MAP_C_1, in step S340. In other words, the controller 130 determines whether or not map information for the first logical address LA_1 is included in the controller map data MAP_C_1 stored in the memory 144, in step S340.

When the first physical address PA_1 is received together with the command CMD and the first logical address LA_1 from the host 102 in step S290, the controller 130 determines validity of the first physical address PA_1 received with the first logical address LA_1, in step S330. The controller 130 may determine the validity of the first physical address PA_1 based on dirty information D_INF or an invalid physical address INV_INF.

When the determination result indicates that the first physical address PA_1 is valid (Yes in S330), the controller 130 may perform an unmap operation on the first physical address PA_1 and the first logical address LA_1 in step S337. The controller 130 then performs an erase operation in step S405. In this case, the controller 130 may further perform an invalidation operation on the first physical address PA_1.

When the first physical address PA_1 is not valid (No in S330), the controller 130 determines that the first physical address PA_1 is invalid. In order to perform the erase operation on a valid second physical address PA_2, the controller 130 searches for the valid second physical address PA_2 corresponding the first logical address LA_1 in the controller map data MAP_C_1. To this end, the controller 130 determines whether or not the map miss occurs in the controller map data MAP_C_1, in step S340. In other words, the controller 130 determines whether or not the map information for the first logical address LA_1 is included in the controller map data MAP_C_1 stored in the memory 144, in step S340.

When the map information for the first logical address LA_1 is included in the controller map data MAP_C_1 (No in S340), the controller 130 determines that a map hit, not a map miss, occurs in the controller map data MAP_C_1. Accordingly, the controller 130 searches for the second physical address PA_2, mapped to the first logical address LA_1, in the controller map data MAP_C_1, in step S345. The controller 130 performs the unmap operation on the second physical address PA_2 searched for and found in step S345 and the first logical address LA_1, in step S400. The unmap operation may include an invalidation operation on the searched second physical address PA_2 for mapping, releasing the second physical address PA_2 and the first logical address LA_1. The controller 130 performs the erase operation of step S405.

When the map information for the first logical address LA_1 is not included in the controller map data MAP_C_1 (Yes in S340), the controller 130 determines that the map miss occurs in the controller map data MAP_C_1. In other words, the controller 130 determines that the second physical address PA_2 mapped to the first logical address LA_1 is not stored in the controller map data MAP_C_1.

The controller 130 performs a map downloading operation on the memory map data MAP_M, in step S365. The controller 130 may request the memory map data MAP_M, including the map information for the first logical address LA_1, from the memory device 150. The memory device 150 may transmit the memory map data MAP_M, including the map information for the first logical address LA_1, to the controller 130, in response to the request for map downloading received from the controller 130. The controller 130 may store the memory map data MAP_M, received from the memory device 150, in the memory 144. Accordingly, the controller map data MAP_C_1 may be updated to controller map data MAP_C_2, in step S382.

The controller 130 searches for the second physical address PA_2, mapped to the first logical address LA_1, in the controller map data MAP_C_2, in step S385. The controller 130 may perform the unmap operation on the second physical address PA_2 searched in step S385 and the first logical address LA_1, in step S400. In this case, the controller 130 may further perform the invalidation operation on the second physical address PA_2.

In the present embodiment, the controller 130 may change a state value of invalid address information INV_INF corresponding to the first physical address PA_1 and the second physical address PA_2 from '0' to '1', in order to perform the invalidation operation on the first physical address PA_1 received from the host 102 and the second physical address PA_2 searched for and found in the steps S345 and S385. In addition, the controller 130 may change a state value of valid page count information VPC of a memory block including pages corresponding to the first physical address PA_1 and the second physical address PA_2.

After performing the unmap operation in steps S337 and S400, the controller 130 may correlate the first logical address LA_1, received from the host 102 in step S280b to the erase information E_INF, in step S405.

In the present embodiment, the erase information E_INF may include an erase physical address EPA of an erase page which is in an erase state or an erase memory block which is in an erase state. In addition, the erase information E_INF may include an erase state value EV.

The erase physical address EPA may include a physical location of an erase page EP, in an erase state, of the memory device 150 in the memory system 110 or a physical location of an erase memory block EM in an erase state. Also, the erase page EP and the erase memory block EM may not be used for storing data.

The erase state value EV may include a value that has a form of a physical address such as a memory block and a page in the memory device 150. In addition, the erase state value EV may include a specific code value that is not in the form of the physical address.

The erase information E_INF may include the erase memory block EM and the erase physical address EPA of the erase page EP included in the erase memory block EM. The erase physical address EPA, as illustrated in FIG. 3, may include a physical address of the erase memory block EM which is not used for storing data in the memory device 150. Such memory block is the memory block BLOCKN 250 in an erase state. In addition, the erase physical address EPA may include a physical address of the erase page EP included in the erase memory block EM.

The erase information E_INF according to the present embodiment may include the erase physical address EPA of one erase page EP, regardless of the size of data relating to the first logical address LA_1. For example, when the size of data that may be stored in one page in the memory device 150 is 4 Kbytes, and the size of data relating to the first logical address LA_1 is 1 Gbyte, 2.5 million pages need to be unmapped, and a garbage collection needs to be performed, in order to erase the data relating to the first logical address LA_1. Thus, the erase operation time may be increased.

However, in the present embodiment, in order to perform an erase command operation on the first logical address LA_1, the 2.5 million pages may be unmapped, and then the first logical address LA_1 may be mapped to one erase physical address EPA or the erase state value EV. Accordingly, the erase operation time may be decreased.

The controller 130 may determine that the operation in response to the erase request E_REQ for the erase operation, received from the host 102 in step S280b, has been completely performed, by correlating the first logical address LA_1 to the erase information E_INF in step S405. Accordingly, the controller 130 may transmit a second response ACK2, in response to the command CMD, to the host 102, in step S408b.

The second response ACK2 may include a message indicating that the erase operation according to the erase request E_REQ has been completely performed. The second response ACK2 may further include a message indicating that the first physical address PA_1 is an invalid physical address. The second response ACK2 may further include a message indicating that the first physical address PA_1 is the invalid physical address, and the second physical address PA_2 has been mapped to the first physical address PA_1.

As illustrated in FIG. 8B, the erase operation time according to the present embodiment includes a time required to perform the steps S290 to S408b. That is, the erase latency includes a time ranging from a time at which the controller 130 receives the erase request E_REQ for the erase operation and the first logical address LA_1 and the first physical address PA_1 from the host 102 to a time at which the erase information E_INF is mapped to the first logical address LA_1.

Subsequently, an erase operation for erasing the data stored in the second physical address PA_2 invalidated in steps S337 and S400 may be performed when the state of the memory system satisfies a condition for performing the garbage collection. The garbage collection may be performed during an idle state of the memory system 110 or at certain fixed times, which may be periodic. In addition, the garbage collection may be performed when the number of free blocks nFB is less than or equal to a set number nFB_TH or the number of valid pages VPC is less than or equal to a set number VPC_TH.

According to an embodiment, an erase operation in response to an erase request E_REQ may be performed by correlating a first logical address LA_1 to erase information E_INF. Accordingly, the time required to perform the erase operation may be reduced.

In addition, according to an embodiment, the erase operation time may be reduced, and thus a command waiting time for receiving a subsequent command, for example, read, program and erase commands, from the host 102 may be shortened. Accordingly, command operation characteristics of the memory system 110 may be improved.

In addition, even though the size of data relating to the first logical address LA_1 is large, the first logical address LA_1 is mapped to the erase physical address EPA of at least one erase page EP. Therefore, the utilization of the memory device 150 may be improved.

According to an embodiment, the controller 130 receives the first logical address LA_1 and the first physical address PA_1 mapped thereto from the host 102 in step S290, and the first physical address PA_1 is valid (that is, Yes in S330), the steps S345 and S385 of searching for the second physical address PA_2 may be omitted. In addition, according to the present embodiment, the operation according to the erase request E_REQ for the erase operation may be performed by corresponding the first logical address LA_1 to the erase information E_INF. Accordingly, the memory system 110 according to the present embodiment may reduce the erase operation time.

According to an embodiment, the garbage collection may not be performed whenever the erase request E_REQ for the erase operation is received, but may be performed when the state of the memory system satisfies a condition for performing the garbage collection. Accordingly, the overhead of the memory system 110 may be decreased.

According to an embodiment, the erase operation time is reduced, and thus the command waiting time for receiving the subsequent command, for example, read, program and erase commands, from the host 102 may be shortened. Accordingly, command operation characteristics of the memory system 110 may be improved.

The memory system and method for performing a command operation according to the above-described embodiments may reduce the erase operation time by correlating a logical address received from the host to erase information, when a command operation is performed according to the logical address received from the host, and an erase request for an erase operation is received from the host.

As the erase operation time is reduced, a request waiting time for receiving a subsequent request, for example, read, program and erase requests from the host may be shortened. Thus, the memory system and method according to the above-described embodiments may improve the command operation characteristics of the memory system.

Although the size of data relating to the logical address received from the host is larger than the storage capacity of one page, the command operation is performed by mapping the logical address to one erase physical address. Thus, the memory system and method according to the above-described embodiments may improve the utilization of the memory device.

An erase operation of the data relating to the logical address requested to be erased, which is received from the host, is not performed whenever the erase request is received, but performed by the garbage collection when the state of the memory system satisfies the condition for performing the garbage collection. Accordingly, the memory system and method according to the above-described embodiments may decrease the overhead of the memory system.

While the present invention has been illustrated and described with respect to specific embodiments, it will be apparent to those skilled in the art in light of the present disclosure that various changes and modifications may be made without departing from the spirit and scope of the invention as defined in the following claims.

Thus, the present invention encompasses all such changes and modifications that fall within the scope of the claims including their equivalents.

What is claimed is:

1. A memory system comprising:
a memory device comprising a memory block having a plurality of pages; and
a controller configured to receive from an external device an erase request for an erase operation and a first logical address relating to the erase request, and correlate the first logical address to erase information,
wherein the erase information includes at least one of an erase physical address of an erase page or an erase memory block in an erased state, and
wherein the controller transmits a response for the erase request to the external device before erasing an invalidated physical address corresponding to the first logical address in map data.

2. The memory system of claim 1, wherein the controller transmits the response for the erase request to the external device after correlating the first logical address to the erase information.

3. The memory system of claim 2, wherein the controller searches for a physical address corresponding to the first logical address in the map data, invalidates the physical address and performs a garbage collection on the invalidated physical address, and
wherein the map data comprises a second logical address used in the external device and a physical address of the memory device.

4. The memory system of claim 3, wherein the controller transmits the response to the external device before performing the garbage collection.

5. The memory system of claim 2, wherein, when a first physical address which is valid and corresponds to the first logical address, is received from the external device, the controller invalidates the valid first physical address, and performs a garbage collection on the invalidated first physical address.

6. The memory system of claim 5, wherein the controller transmits the response to the external device before performing the garbage collection.

7. The memory system of claim 1, wherein the controller does not use the erase page or the erase memory block for storage of data after correlating the first logical address to the erase physical address.

8. A method for performing a command operation by a memory system that includes a memory device including a memory block having a plurality of pages and a controller configured to control the memory device, the method comprising:
receiving, from an external device, an erase request for an erase operation and a first logical address relating to the erase request; and
correlating the first logical address to erase information,
wherein the erase information includes at least one of an erase physical address of an erase page or an erase memory block in an erased, and
wherein the controller transmits a response for the erase request to the external device before erasing an invalidated physical address corresponding to the first logical address in map data.

9. The method of claim 8, further comprising transmitting the response to the erase request to the external device after correlating the first logical address to the erase information.

10. The method of claim 9, further comprising:
searching for a physical address, corresponding to the first logical address, in the map data;
invalidating the physical address in the map data found as a result of the searching; and
performing a garbage collection on the invalidated physical address,
wherein the map data comprises a second logical address used in the external device and a physical address of the memory device.

11. The method of claim 10, wherein the transmitting of the response for the erase request to the external device is performed before the performing of the garbage collection on the invalidated physical address.

12. The method of claim 8, wherein the erase page or the erase memory block is not used for storage of data after the correlating of the first logical address to the erase information.

13. The method of claim 8, further comprising:
when a first physical address, which is valid and corresponds to the first logical address, is received from the external device, invalidating the valid first physical address in the map data; and
performing a garbage collection on the invalidated first physical address, wherein the map data comprises a logical address used in the external device and a physical address of the memory device.

14. The method of claim 8, further comprising:
receiving a read request and a second logical address from the external device after the corresponding of the first logical address to the erase information; and
transmitting a response to the read request including a message indicating that data relating to the second logical address is not stored in the memory device to the external device when the second logical address corresponds to the erase information.

15. The method of claim 8, further comprising:
receiving a read request and a second logical address from the external device after the corresponding of the first logical address to the erase information; and
transmitting a response to the read request including a message indicating that data relating to the second logical address is not searched in the memory device to the external device when the second logical address does not to the erase information.

16. A method of reducing erase time in a memory system including a memory device, the method comprising:
receiving an erase request for an erase operation and a logical address related to the erase request from an external device;
correlating the logical address to an erased location in the memory device;
searching map data for a physical address corresponding to the logical address;
invalidating the physical address found in the searching operation;
transmitting a response for the erase request to the external device before erasing an invalidated physical address corresponding to the first logical address in the map data; and
erasing the invalidated physical address based on a garbage collection trigger condition by a garbage collection,
wherein the erased location includes at least one of an erase page or an erase memory block in an erased state.

* * * * *